US011981145B2

(12) United States Patent
Hayashi et al.

(10) Patent No.: US 11,981,145 B2
(45) Date of Patent: May 14, 2024

(54) PRINTING LIQUID CONTAINER, CONTAINER SET, AND SYSTEM INCLUDING PRINTING LIQUID CONTAINERS AND TANKS

(71) Applicant: BROTHER KOGYO KABUSHIKI KAISHA, Nagoya (JP)

(72) Inventors: Masahiro Hayashi, Nishio (JP); Satoru Oki, Nagoya (JP); Nanami Ashida, Nagoya (JP); Naoya Okazaki, Hashima (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 144 days.

(21) Appl. No.: 17/679,687

(22) Filed: Feb. 24, 2022

(65) Prior Publication Data

US 2022/0274416 A1 Sep. 1, 2022

(30) Foreign Application Priority Data

Feb. 26, 2021 (JP) ................................ 2021-030269

(51) Int. Cl.
*B41J 2/175* (2006.01)
*B41J 29/13* (2006.01)

(52) U.S. Cl.
CPC ....... *B41J 2/17553* (2013.01); *B41J 2/17509* (2013.01); *B41J 2/17513* (2013.01);
(Continued)

(58) Field of Classification Search
CPC .... B41J 2/175; B41J 2/17503; B41J 2/17506; B41J 2/17509; B41J 2/17513; B41J 2/17536; B41J 2/17553; B41J 29/13
See application file for complete search history.

(56) References Cited

U.S. PATENT DOCUMENTS 6,213,597 B1 * 4/2001 Liu ...................... B41J 2/17503 347/85
8,025,372 B2 * 9/2011 Umeda ................ B41J 2/17513 347/85

(Continued)

FOREIGN PATENT DOCUMENTS

JP 2021-006396 A 1/2021

OTHER PUBLICATIONS

International Search Report and Written Opinion dated May 10, 2022 from related PCT/JP2022/007059.

*Primary Examiner* — Anh T Vo
(74) *Attorney, Agent, or Firm* — Scully, Scott, Murphy & Presser, P.C.

(57) ABSTRACT

A printing liquid container fits to one of first and second tanks each including a fitted portion. The printing liquid container includes a first member having a supply port, and a second member having a valve configured to open or close the supply port. The first member and the second member are rotatable with respect to each other between a first state and a second state. The valve closes the supply port in the first state and opens the supply port in the second state. The first member has a fitting portion configured to fit to the fitted portion. The second member is rotatable with respect to the fitted portion when at least a portion of the second member is inserted into the fitted portion. The first member does not rotate by the rotation of the second member due to the fitting between the fitted portion and the fitting portion.

21 Claims, 14 Drawing Sheets

(52) U.S. Cl.
CPC ....... *B41J 2/17536* (2013.01); *B41J 2/17596* (2013.01); *B41J 29/13* (2013.01)

(56) References Cited

U.S. PATENT DOCUMENTS

| | | | |
|---|---|---|---|
| 10,427,412 | B2 * | 10/2019 | Okude ................... B41J 2/1752 |
| 2016/0355021 | A1 | 12/2016 | Kanbara et al. |
| 2017/0355191 | A1 * | 12/2017 | Mizutani .............. B41J 2/17533 |
| 2019/0061359 | A1 | 2/2019 | Duca et al. |
| 2020/0406625 | A1 | 12/2020 | Mizutani et al. |

* cited by examiner

PRINTING LIQUID CONTAINER, CONTAINER SET, AND SYSTEM INCLUDING PRINTING LIQUID CONTAINERS AND TANKS

CROSS REFERENCE TO RELATED APPLICATIONS

This application claims priority under 35 U.S.C. § 119 from Japanese Patent Application No. 2021-030269 filed on Feb. 26, 2021. The entire subject matter of the application is incorporated herein by reference.

BACKGROUND

Aspects of the present disclosure relate to a printing liquid container for storing liquid and a container set.

In a conventional printing device, a configuration is known in which ink is supplied to a tank from a bottle connected to the tank each time ink stored in the tank is consumed. When the ink stored in the tank is consumed, the ink is supplied from the bottle to the tank through an injection port of the tank. When different types of ink, such as different ink colors, are stored in a plurality of tanks, a bottle is formed with a concavo-convex shape that can only be fitted to a specific tank so as not to be erroneously connected to tanks other than the specific tank.

SUMMARY

The bottle has a supply port for supplying ink. The bottle is provided is a cap to prevent ink from leaking out of the supply port. However, it is troublesome to remove or attach the cap when using the bottle. Further, there is a possibility that a space for placing the removed cap is required, the removed cap is lost, or the cap is mistaken for another when there is a plurality of bottles. Therefore, it is desirable to provide a bottle of which the supply port can be opened and closed with a simple structure without using a cap. On the other hand, if an outer shape or the like of the bottle changes due to opening and closing of the supply port, it is difficult to realize fitting with a specific tank.

According to aspects of the present disclosure, there is provided a printing liquid container configured to fit to one of a first tank and a second tank each including a fitted portion having an injection port. The printing liquid container includes a first member having a supply port communicating with an internal space, and a second member having a valve configured to open or close the supply port. The first member and the second member are coupled to each other so as to be rotatable with respect to each other between a first state and a second state. An internal space of the first member and an internal space of the second member constitute a storage chamber configured to store liquid. The valve closes the supply port in the first state and opens the supply port in the second state. One of the first member and the second member has a first fitting portion configured to fit to the fitted portion of the first tank or the second tank. An other of the first member and the second member is rotatable with respect to the fitted portion in a state where at least a portion of the other of the first member and the second member is inserted into the fitted portion. The one of the first member and the second member is configured not to be rotated by the rotation of the other of the first member and the second member due to the fitting between the fitted portion and the first fitting portion.

According to aspects of the present disclosure, there is further provided a container set including a first printing liquid container and a second printing liquid container. Each of the first printing liquid container and the second printing liquid container includes a first member having a supply port communicating with an internal space, and a second member having a valve configured to open or close the supply port. The first member and the second member are coupled to each other so as to be rotatable with respect to each other between a first state and a second state. An internal space of the first member and an internal space of the second member constitute a storage chamber configured to store liquid. The valve closes the supply port in the first state and opens the supply port in the second state. One of the first member and the second member has a projection or a first groove. An other of the first member and the second member has, on an outer surface thereof, a second groove extending in a first direction along an axis of the relative rotation, and a third groove extending from the second groove in a second direction along a circumferential direction of the axis. The third groove of the first printing liquid container and the third groove of the second printing liquid container are different in position with respect to the second groove in the first direction.

According to aspects of the present disclosure, there is further provided a system including a first printing liquid container, a second liquid container, a first tank, and a second tank. Each of the first tank and the second tank includes a fitted portion having an injection port, the fitted portion of the first tank and the fitted portion of the second tank being different from each other. The first printing liquid container and the second printing liquid container are configured to fit to the fitted portions of the first tank and the second tank, respectively. Each of the first printing liquid container and the second printing liquid container includes a first member having a supply port communicating with an internal space, and a second member having a valve configured to open or close the supply port. The first member and the second member are coupled to each other so as to be rotatable with respect to each other between a first state and a second state. An internal space of the first member and an internal space of the second member constitute a storage chamber configured to store liquid. The valve closes the supply port in the first state and opens the supply port in the second state. One of the first member and the second member has a first fitting portion configured to fit to the fitted portion. An other of the first member and the second member is rotatable with respect to the fitted portion in a state where at least a portion of the other of the first member and the second member is inserted into the fitted portion. The one of the first member and the second member is configured not to be rotated by the rotation of the other of the first member and the second member due to the fitting between the fitted portion and the first fitting portion.

DETAILED DESCRIPTION

Figure 1:
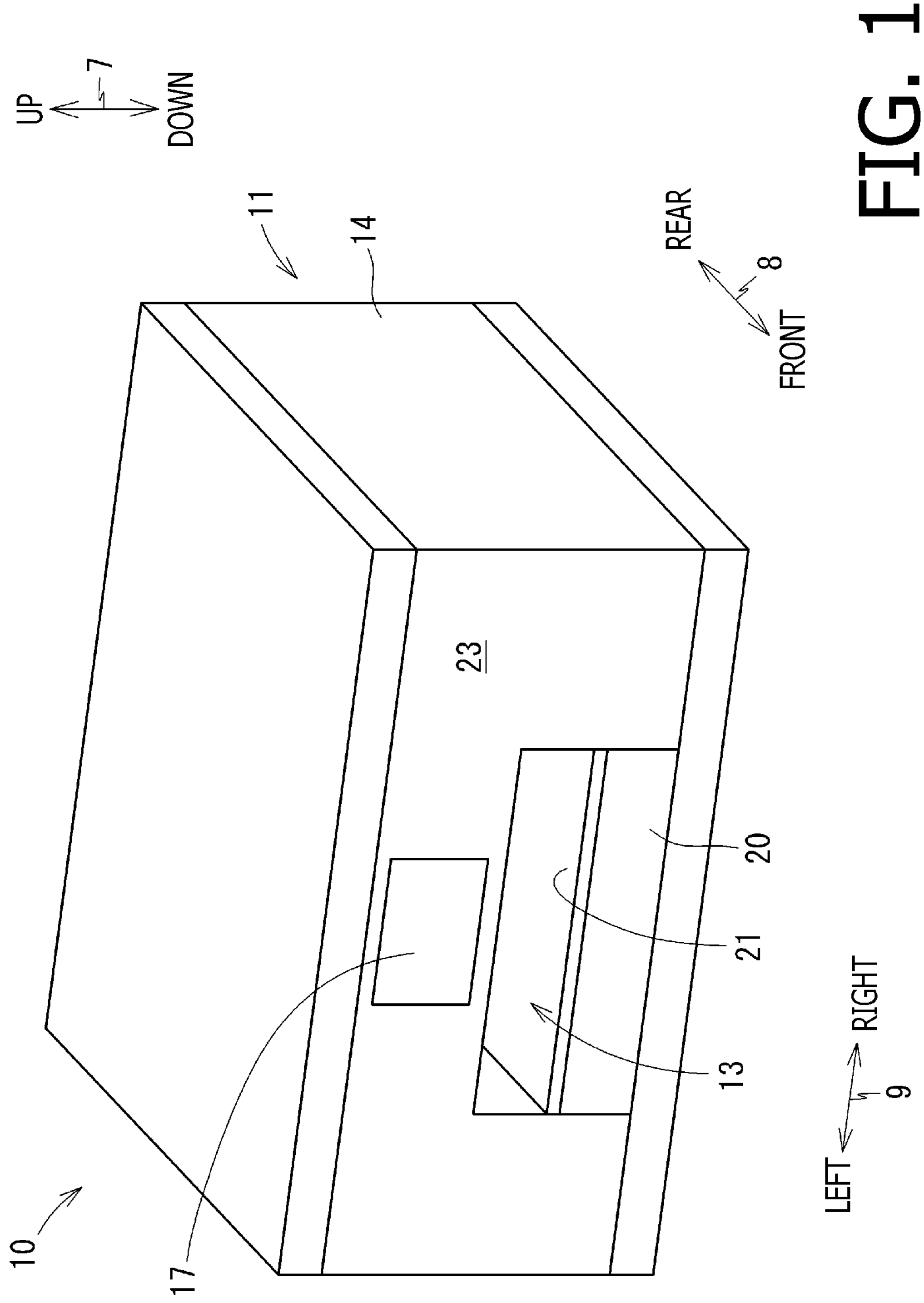
FIG. 1 is an external perspective view of a multifunction device.

Hereinafter, an embodiment of the present disclosure will be described. It should be noted that the embodiment described below is merely an example of the present disclosure, and the embodiment can be modified appropriately without changing the scope of the present disclosure. In the following description, a way from a starting point to an ending point of an arrow is referred to as an orientation, and ways along a line connecting the starting point and the ending point of the arrow are collectively referred to as a direction. In other words, the orientation is a component of the direction. An up-down direction 7 is defined based on a posture of a multifunction device 10 which is installed on a horizontal plane so as to be usable (the posture shown in FIG. 1 which is also referred to as a "use posture"), a front-rear direction 8 is defined based on a surface on which an opening 13 of the multifunction device 10 is provided which is defined as front, and a left-right direction 9 is defined by viewing the multifunction device 10 from the front. In the present embodiment, in the use posture, the up-down direction 7 corresponds to the vertical direction, and the front-rear direction 8 and the left-right direction 9 correspond to the horizontal direction. The front-rear direction 8 and the left-right direction 9 are orthogonal to each other.

[Overall Structure of Multifunction Device 10]

As shown in FIG. 1, the multifunction device 10 has a housing 14 having a substantially rectangular parallelepiped shape. A printer unit 11 is provided in a lower part of the housing 14. The multifunction device 10 has various functions such as a facsimile function and a print function. The multifunction device 10 has a printing function of recording an image on one side of a sheet 12 by an inkjet system. It should be noted that the multifunction device 10 may be configured to record images on both sides of the sheet 12. An operation unit 17 is provided on an upper part of the housing 14. The operation unit 17 consists of buttons operated for image recording instructions and various settings, a liquid crystal display for displaying various information, and the like. In the present embodiment, the operation unit 17 consists of a touch panel which serves as the buttons and the liquid crystal display.

Figure 2:
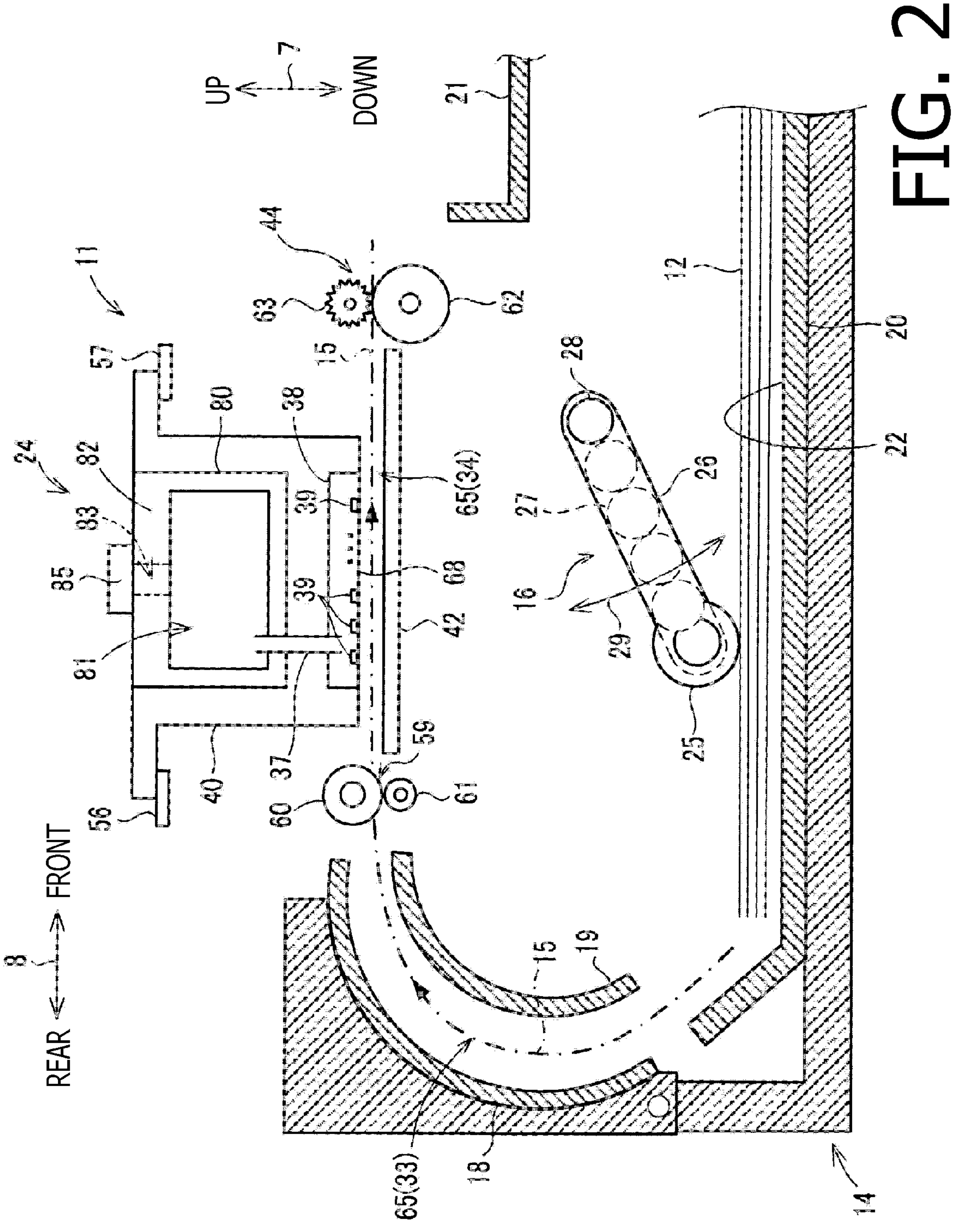
FIG. 2 is a longitudinal cross-sectional view schematically showing an internal structure of a printer unit.

As shown in FIG. 2, the printer unit 11 includes a feeding tray 20, a feeding unit 16, an outer guide member 18, an inner guide member 19, a conveying roller pair 59, a discharge roller pair 44, a platen 42, and a recording unit 24 which are accommodated in the housing 14. Various state sensors configured to detect states of the multifunction device 10 and output signals corresponding to the detection results are accommodated in the housing 14. The configuration of the printer unit 11 is merely an example, and the configuration of the printer unit 11 may be replaced with another known configuration.

[Feeding Tray 20]

As shown in FIG. 1, an opening 13 is formed on a front surface 23 of the printer unit 11. The feeding tray 20 can be inserted into and extracted from the housing 14 through the opening 13 by moving the feeding tray 20 in the front-rear direction 8. The feeding tray 20 is movable between a feeding position (a position shown in FIGS. 1 and 2) where the feeding tray 20 is mounted to the housing 14 and a non-feeding position where the feeding tray 20 is extracted from the housing 14. The feeding tray 20 moves to the feeding position by being inserted backward with respect to the housing 14, and moves to the non-feeding position by being pulled out forward with respect to the housing 14.

The feeding tray 20 is a box-shaped member having an open upper portion and accommodates the sheets 12. As shown in FIG. 2, the sheets 12 are supported on a bottom plate 22 of the feeding tray 20 in a stacked state. A discharge tray 21 is provided above a front portion of the feeding tray 20. The sheet 12 on which an image has been recorded by the recording unit 24 and discharged is supported on an upper surface of the discharge tray 21.

As shown in FIG. 2, when the feeding tray 20 is at the feeding position, the sheets 12 supported by the feeding tray 20 can be fed to a conveying path 65.

[Feeding Unit 16]

As shown in FIG. 2, the feeding unit 16 is arranged below the recording unit 24 and above the bottom plate 22 of the feeding tray 20. The feeding unit 16 includes a feeding roller 25, a feeding arm 26, a drive transmission mechanism 27, and a shaft 28. The feeding roller 25 is rotatably supported at a distal end of the feeding arm 26. The feeding arm 26 swings about the shaft 28 provided at a proximal end in a direction of an arrow 29. Thus, the feeding roller 25 can contact and separate from the feeding tray 20 or the sheet 12 supported by the feeding tray 20.

The feeding roller 25 rotates by a driving force of a motor transmitted to the feeding roller 25 by the drive transmission mechanism 27 in which a plurality of gears are meshed. As a result, of the sheets 12 supported by the bottom plate 22 of the feeding tray 20 at the feeding position, the uppermost sheet 12 in contact with the feeding roller 25 is fed to the conveying path 65.

[Conveying Path 65]

As shown in FIG. 2, the conveying path 65 extends from a rear end of the feeding tray 20. The conveying path 65 includes a curved portion 33 and a straight portion 34. The curved portion 33 extends upward from the rear to the front in a U-shape. The straight portion 34 extends generally along the front-rear direction 8.

The curved portion 33 is formed by the outer guide member 18 and the inner guide member 19 opposed to each other at a predetermined interval. The outer guide member 18 and the inner guide member 19 extend in the left-right direction 9. Within a range where the recording unit 24 is arranged, the straight portion 34 is formed by the recording unit 24 and the platen 42 opposed to each other with a predetermined interval in the up-down direction 7.

The sheet 12 supported by the feeding tray 20 is conveyed by the feeding roller 25 through the curved portion 33 and reaches the conveying roller pair 59. The sheet 12 nipped by the conveying roller pair 59 is conveyed forward through the straight portion 34 toward the recording unit 24. Ink ejected from the recording unit 24 adheres to the sheet 12 that has reached a position directly below the recording unit 24 and thereby an image is recorded on the sheet 12. The sheet 12 on which the image has been recorded is conveyed forward through the straight portion 34 and discharged on the discharge tray 21. As described above, the sheet 12 is conveyed along a conveying orientation 15 indicated by an arrow of a one dot chain line in FIG. 2.

[Conveying Roller Pair 59 and Discharge Roller Pair 44]

As shown in FIG. 2, the conveying roller pair 59 is arranged in the straight portion 34. The discharge roller pair 44 is arranged in the straight portion 34 downstream of the conveying roller pair 59 in the conveying orientation 15.

The conveying roller pair 59 includes a conveying roller 60 and a pinch roller 61 arranged below the conveying roller 60. The pinch roller 61 is pressed against the conveying roller 60 by a not-shown elastic member such as a coil spring. The conveying roller pair 59 can nip the sheet 12.

The discharge roller pair 44 includes a discharge roller 62 and a spur roller 63 arranged above the discharge roller 62. The spur roller 63 is pressed toward the discharge roller 62 by a not-shown elastic member such as a coil spring. The discharge roller pair 44 is can nip the sheet 12.

The conveying roller 60 and the discharge roller 62 are rotated by driving forces from motors. As the conveying roller 60 rotates in a state where the sheet 12 is nipped by the conveying roller pair 59, the sheet 12 is conveyed in the conveying orientation 15 by the conveying roller pair 59 and conveyed on the platen 42. As the discharge roller 62 rotates in a state where the sheet 12 is nipped by the discharge roller pair 44, the sheet 12 is conveyed in the conveying orientation 15 by the discharge roller pair 44 and discharged onto the discharge tray 21.

[Platen 42]

As shown in FIG. 2, the platen 42 is arranged in the straight portion 34 of the conveying path 65. The platen 42 faces the recording unit 24 in the up-down direction 7. The platen 42 supports the sheet 12 conveyed through the conveying path 65 from below.

[Recording Unit 24]

As shown in FIG. 2, the recording unit 24 is arranged above the platen 42. The recording unit 24 includes a carriage 40, a head 38, and tanks 80.

The carriage 40 is supported by two guide rails 56 and 57 which are spaced apart from each other in the front-rear direction 8 so as to be movable along the left-right direction 9 orthogonal to the conveying orientation 15. The guide rail 56 is arranged upstream of the head 38 in the conveying orientation 15. The guide rail 57 is arranged downstream of the head 38 in the conveying orientation 15. The guide rails 56 and 57 are supported by a pair of not-shown side frames arranged outside the straight portion 34 of the conveying path 65 in the left-right direction 9. The carriage 40 moves when a driving force is supplied from the motor.

The head 38 is supported by the carriage 40. A lower surface 68 of the head 38 is exposed downward and faces the platen 42. The head 38 includes a plurality of nozzles 39, ink flow paths 37, and not-shown piezoelectric elements.

The plurality of nozzles 39 are open to the lower surface 68 of the head 38. The ink flow paths 37 connect the tanks 80 and the plurality of nozzles 39. The piezoelectric elements deform as power is supplied, and deform in the ink flow paths 37 to eject ink droplets downward from the nozzles 39.

Figure 4:
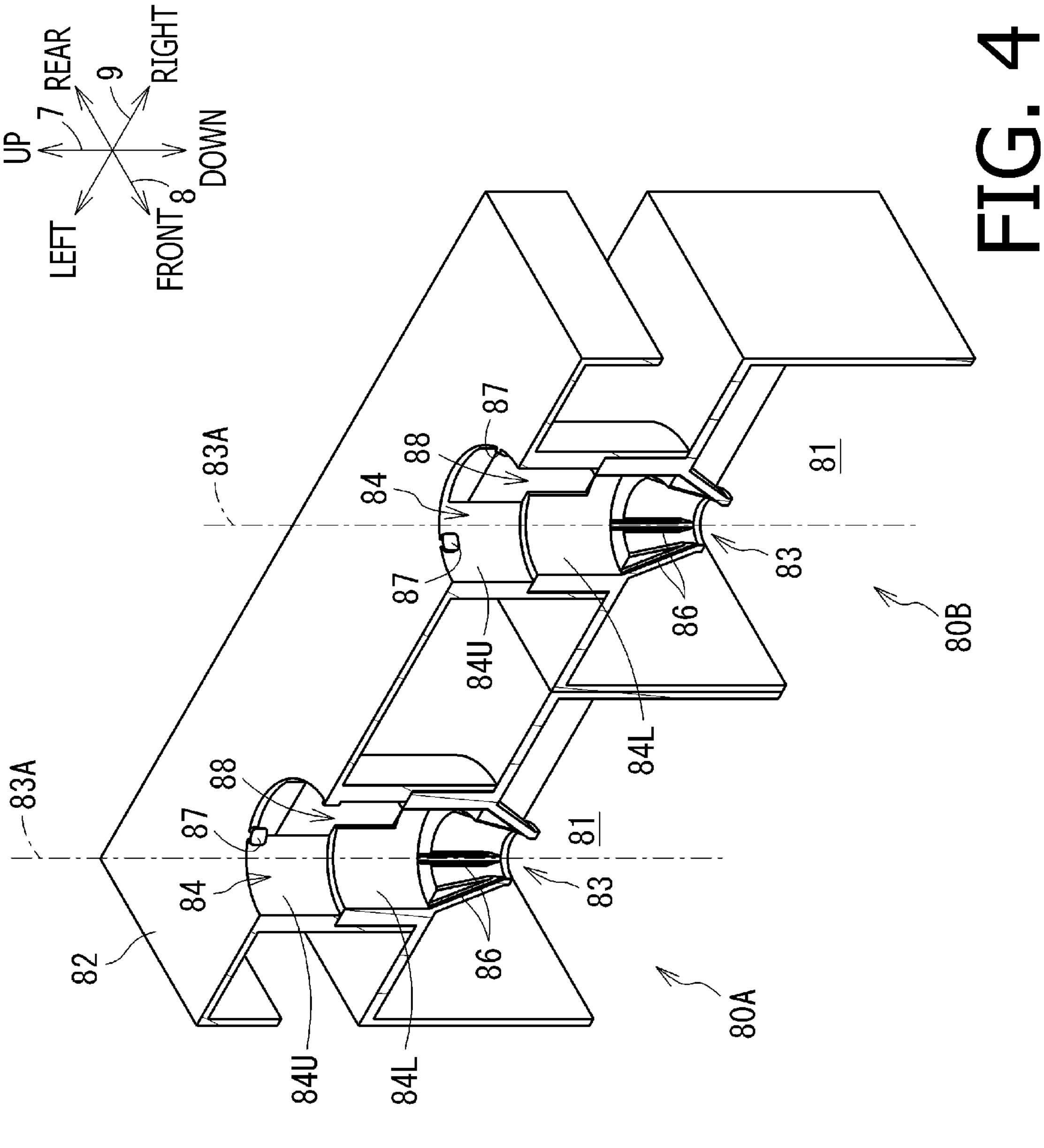
FIG. 4 is a cross-sectional view showing sections of the tanks along an up-down direction including axes of the tanks.

As shown in FIG. 2, the tanks 80 are mounted on the carriage 40. As shown in FIGS. 2 and 4, each tank 80 has an internal space 81. Ink is stored in the internal space 81. The internal space 81 of the tank 80 communicates with the plurality of nozzles 39 via the ink flow path 37. As a result, ink is supplied from the internal space 81 to the nozzles 39.

As shown in FIG. 2, the tanks 80 are arranged above the head 38. Although, in the present embodiment, all the tanks 80 are arranged above the head 38, the positional relationship between the tanks 80 and the head 38 may be changed as appropriate. In the present embodiment, the recording unit 24 includes four tanks 80. For example, Black ink, Cyan ink, Magenta ink and yellow ink are stored in the four tanks 80, respectively. It should be noted that types of inks stored in the tanks 80 are not limited to different colors.

Figure 3:
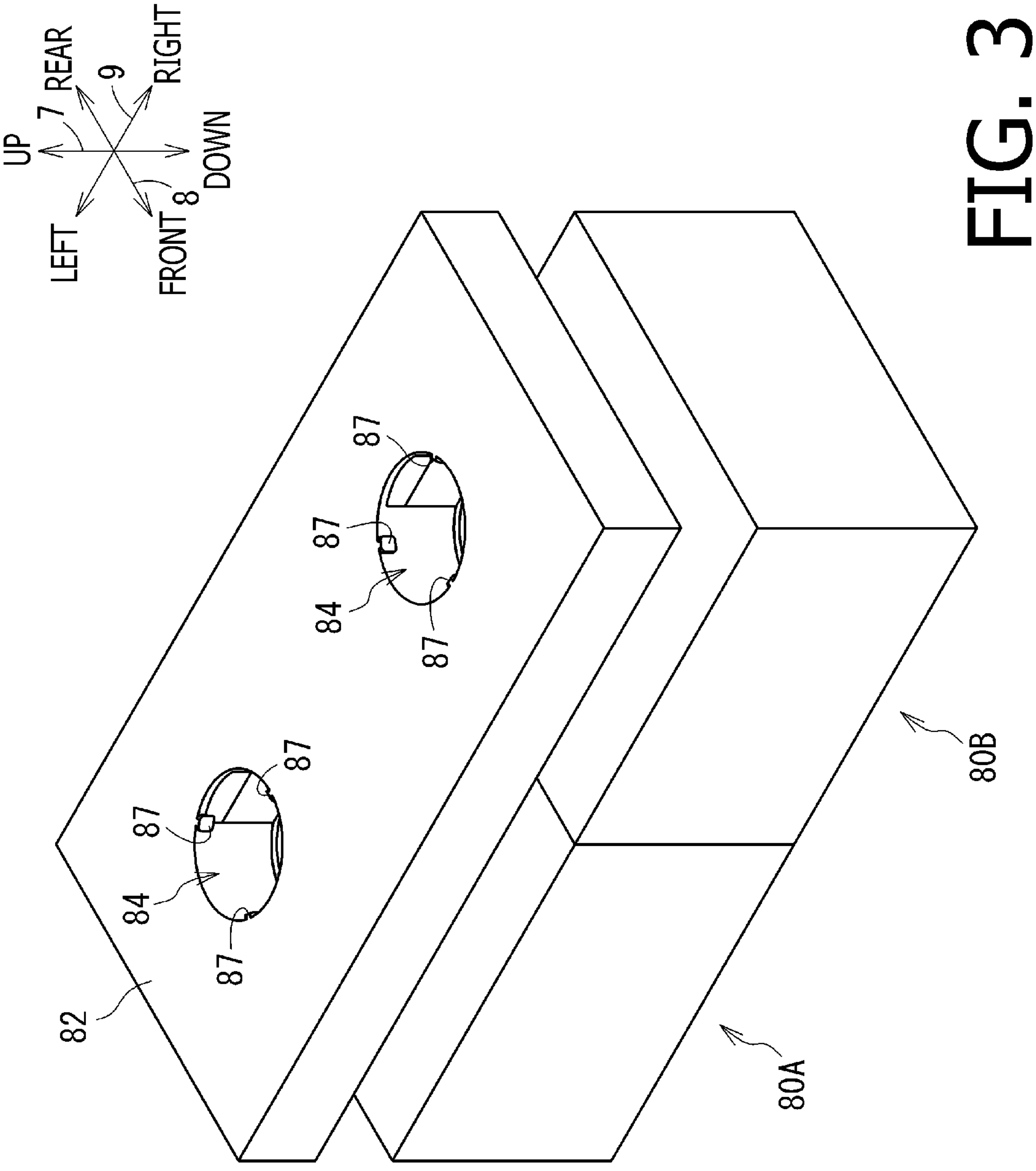
FIG. 3 is an external perspective view of tanks.

Two tanks 80A and 80B are shown in FIGS. 3 and 4. As described above, there are four tanks 80, but only two of them will be illustrated to describe the configuration of the tanks 80. Each of upper walls 82 of the tanks 80A and 80B has a recess 84 that is recessed toward the internal space 81. A cross section of the recess 84 is a circular shape into which a bottle 100 (see FIGS. 6A and 6B) can be inserted. An injection port 83 configured to inject ink into the internal space 81 is formed at a lower end of the recess 84.

A plurality of grooves 86 into which the bottle 100 described later is to be fitted are radially formed in the recess 84 around the injection port 83, and are partially unevenly arranged in the circumferential direction. In other words, the plurality of grooves 86 are radially formed around the injection port 83 with equal intervals in the circumferential direction, but the groove 86 is not formed at some positions in the circumferential direction. Each groove 86 extends linearly outward from the injection port 83.

Figure 5A:
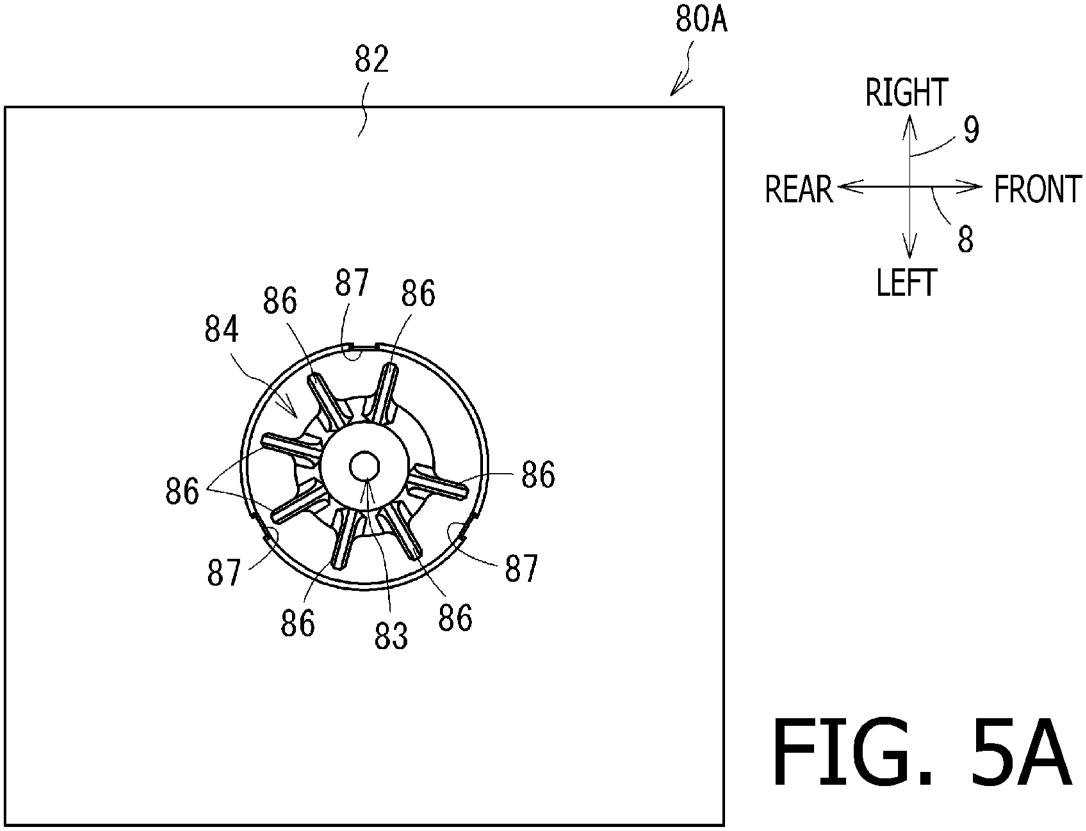
FIG. 5A is a plan view of one of the tanks.
Figure 5B:
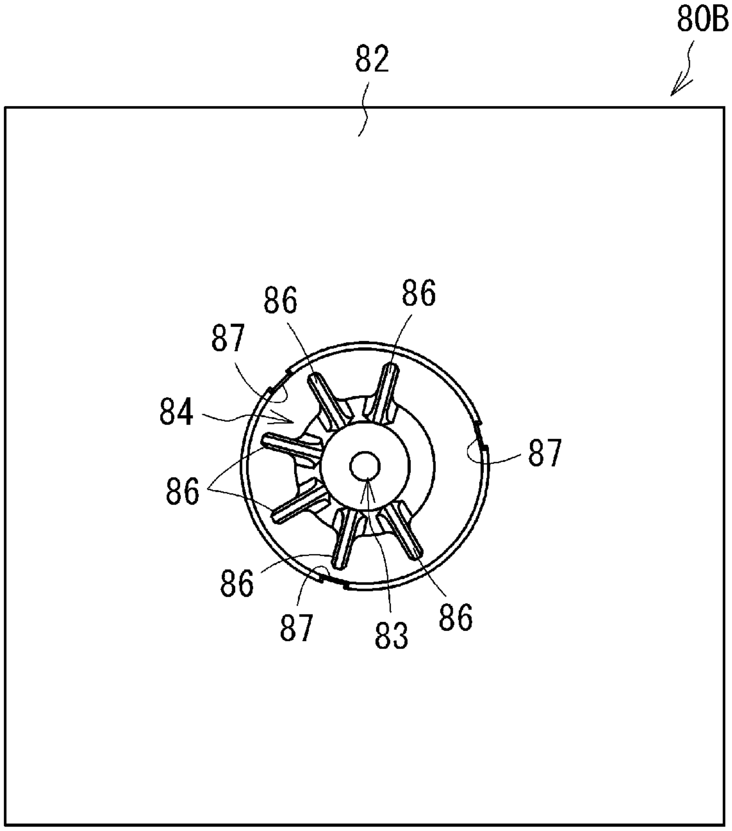
FIG. 5B is a plan view of the other of the tanks.

In the present embodiment, as shown in FIG. 5A, in the tank 80A, seven grooves 86 are arranged at intervals of 45 degrees obtained by dividing 360 degrees around the injection port 83 into eight equal parts. Therefore, an interval between two grooves 86 sandwiching one position among eight where the groove 86 is not formed is 90 degrees. As shown in FIG. 5B, in the tank 80B, six grooves 86 are formed at intervals of 45 degrees obtained by dividing 360 degrees around the injection port 83 into eight equal parts. The groove 86 is not formed at adjacent two positions among eight. Therefore, an interval between two grooves 86 sandwiching the two positions where the groove 86 is not formed is 135 degrees.

Three projections 87 are formed at an upper end portion of the recess 84. The three projections 87 are arranged at intervals of 120 degrees about an axis 83A of the injection port 83. Each projection 87 projects from the upper end portion of the recess 84 toward the axis 83A.

Positions of the three projections 87 on the upper ends of the recesses 84 in the circumferential direction in the tanks 80A and 80B, respectively, are different. In other words, in the tanks 80A and 80B, respective relative positional relationships 83 between the position where the groove 86 is not formed and the three projections 87 around the injection port are different. In the present embodiment, the relative positional relationship of the three projections 87 of the tank 80B with respect to the position where the groove 86 is not formed around the injection port 83 is different from the relative positional relationship of the three projections 87 of the tank 80A with respect to the position where the groove 86 is not formed around the injection port 83 by 90 degrees clockwise when viewed from the top. Similarly, two more tanks can be designed in which the respective relative positional relationships of the three projections 87 with respect to the position where the groove 86 is not formed around the injection port 83 are different further by 90 degrees clockwise. That is, four types of tanks can be designed in which the respective relative positional relationships between the position where the groove 86 is not formed and the three projections 87 around the injection port 83 are different.

An inner surface of the recess 84 is a stepped cylindrical surface in which an inner diameter of a lower section 84L is smaller than an inner diameter of an upper section 84U. A notch 88 extending downward is formed at a portion in a circumferential direction of an upper end of the lower section 84L. A COB 116 enters the notch 88. Although not shown in the drawings, a contact to be electrically connected to the COB 116 is provided outside the notch 88.

As shown in FIG. 2, a lid 85 is fitted in the recess 84. When the lid 85 is removed, the injection port 83 is exposed to the outside. In this state, the bottle 100 is inserted into the recess 84, and ink is injected from the bottle 100 into the internal space 81 through the injection port 83.

Although not shown in the drawings, the tank 80 may be provided with an atmospheric relief port. The atmospheric relief port may be openable and closable by a solenoid valve or the like.

[Bottle 100]

Hereinafter, the bottle 100 will be described with reference to FIGS. 6A to 9. The bottle 100 stores ink. The bottle 100 fits to one of the plurality of tanks 80 and supplies ink to the fitted tank 80 through the injection port 83. As shown in FIGS. 6A to 7C, the bottle 100 includes a nozzle member 101, a valve body 102, and a housing 103.

Figure 6A:
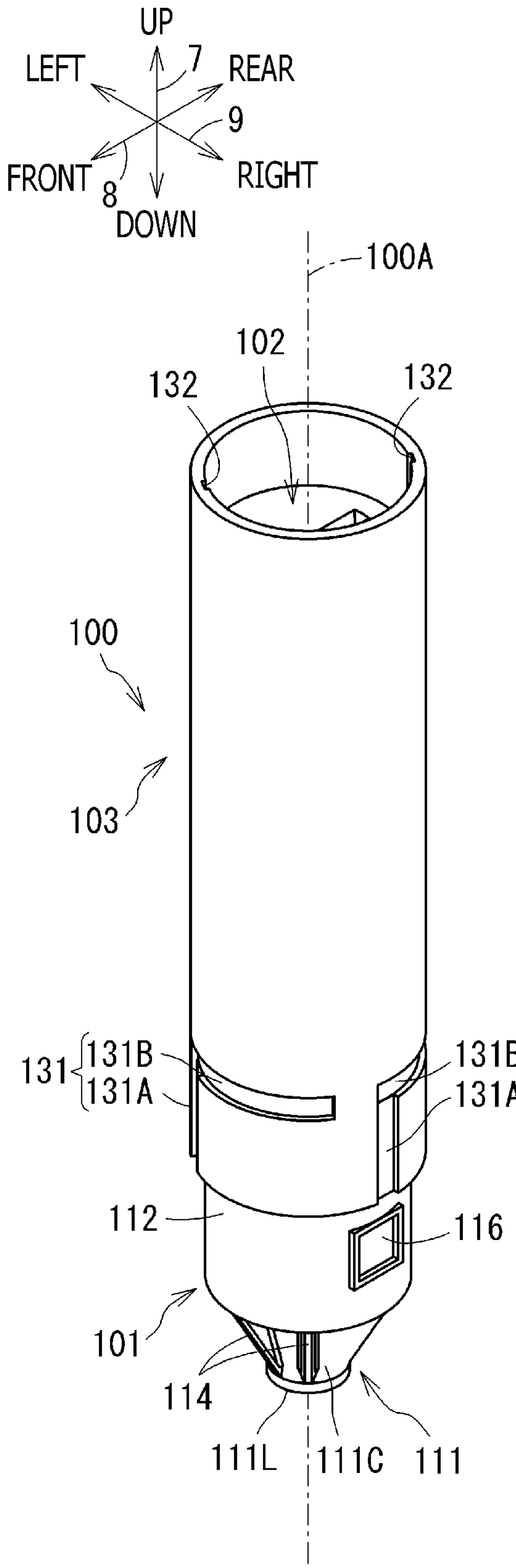
FIG. 6A is an external perspective view of a bottle in a first state.
Figure 6B:
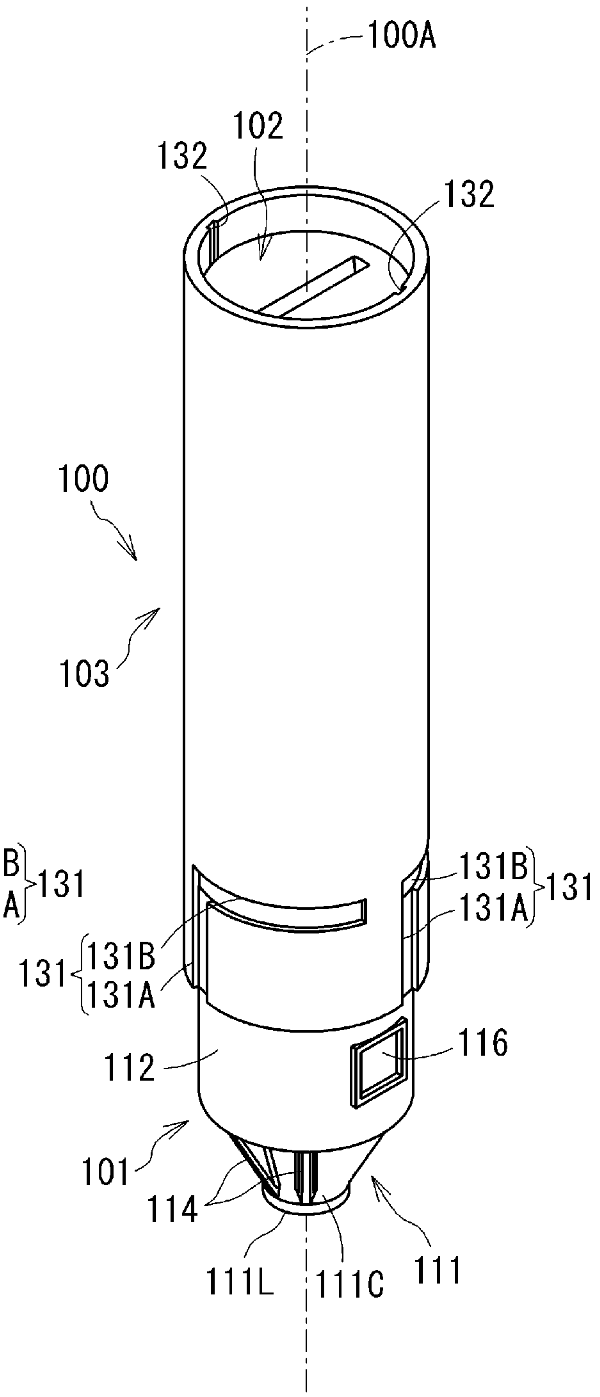
FIG. 6B is an external perspective view of the bottle in a second state.

As shown in FIG. 6, an outer shape of the bottle 100 is a substantially cylindrical shape elongated in the up-down direction 7. While the bottle 100 is shown in FIGS. 6A, 6B, 8A, 8B and 9 with a supply port 113 facing downward, the bottle 100 may be placed with the supply port 113 facing upward during transportation and storage.

Figure 8A:
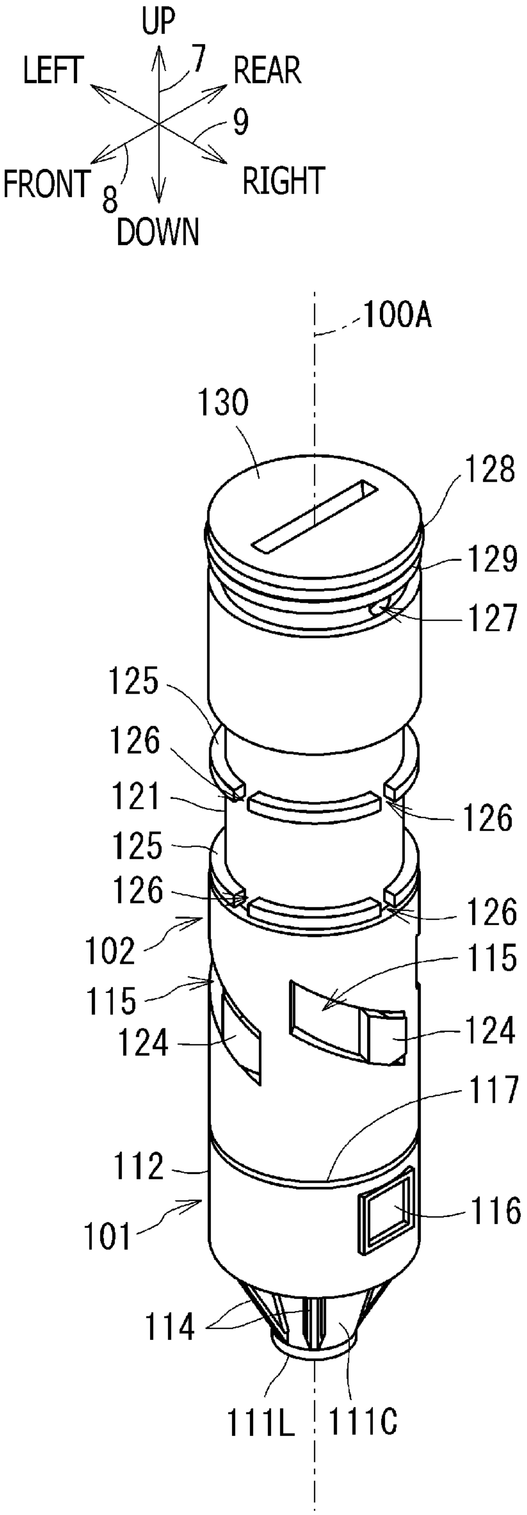
FIG. 8A is a perspective view showing a nozzle member and a valve body in the first state.
Figure 8B:
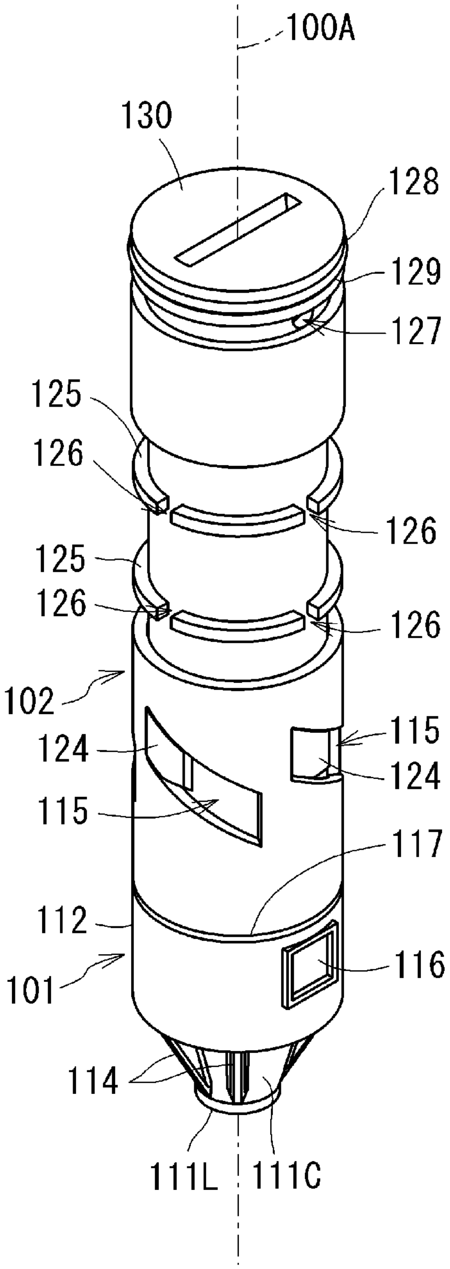
FIG. 8B is a perspective view showing the nozzle member and the valve body in the second state.
Figure 9:
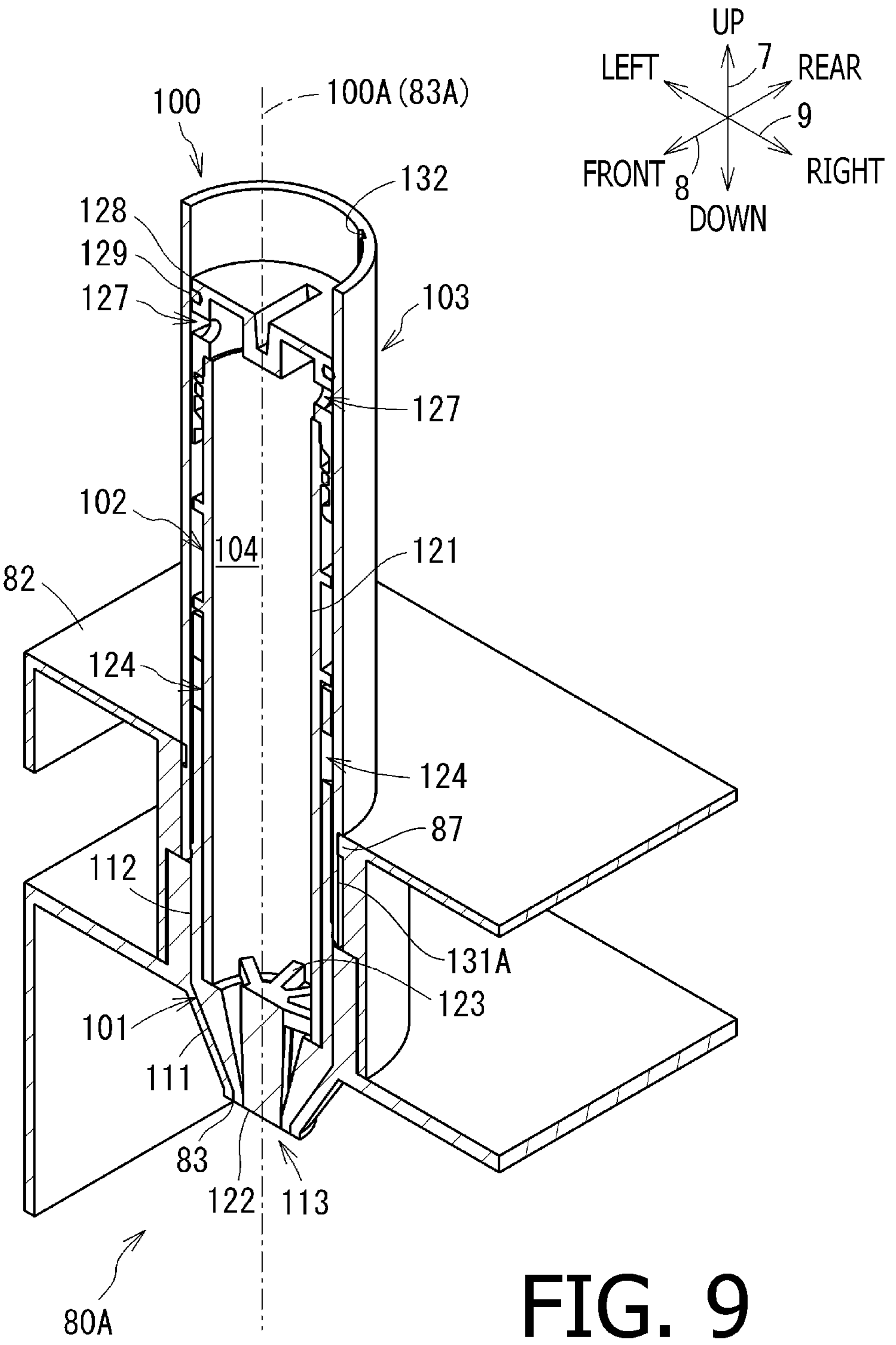
FIG. 9 is a cross-sectional view showing a state in which the bottle in the first state is inserted into a recess of the one of the tanks.

As shown in FIGS. 8A, 8B and 9, the nozzle member 101 is accommodated inside the housing 103, and a portion of the nozzle member 101 protrudes outward (downward in each figure) from the housing 103. The nozzle member 101 includes a nozzle portion 111 and an inserting portion 112.

An outer shape of the nozzle portion 111 is generally cylindrical, tapering downward. The supply port 113 opens to a lower end surface 111L of the nozzle portion 111. The supply port 113 is circular and communicates an internal space of the nozzle portion 111 with the outside. On an outer peripheral surface 111C of the nozzle portion 111, a plurality of elongated engaging ribs 114 extending in the up-down direction 7 are formed.

As shown in FIG. 7, the plurality of engaging ribs 114 are formed radially about the supply port 113, and the engaging ribs 114 is missing at only one of positions at constant intervals in the circumferential direction. In the present embodiment, seven engaging ribs 114 are formed at 45-degree intervals obtained by dividing 360 degrees around the supply port 113 into eight equal parts. Therefore, an interval between two engaging ribs 114 sandwiching the position among eight where the engaging rib 114 is not formed is 90 degrees.

Each engaging rib 114 enters and engages with a corresponding groove 86 of the tank 80. The number and arrangement of the engaging ribs 114 correspond to the number and arrangement of the grooves 86 of the tank 80A. Therefore, when a rotational position of the bottle 100 in the circumferential direction with respect to the recess 84 of the tank 80A is adjusted so that the position where the engaging rib 114 is missing and the position where the groove 86 is not formed coincide with each other, each engaging rib 114 engages with the corresponding groove 86. On the other hand, the number and arrangement of the engaging ribs 114 do not match the number and arrangement of the grooves 86 in the tank 80B.

The inserting portion 112 extends upward from an upper end of the nozzle portion 111. The inserting portion 112 has a substantially cylindrical shape. An axis of the nozzle portion 111 and an axis of the inserting portion 112 coincide with an axis 100A of the bottle 100. The inserting portion 112 is inserted into an internal space of the valve body 102. An internal space of the inserting portion 112 communicates with the internal space of the nozzle portion 111.

Guide grooves 115 which constitute parts of spiral shapes around the axis 100A are formed to a peripheral wall of the inserting portion 112. The guide grooves 115 are formed at three positions around the axis 100A, and penetrates through the peripheral wall of the inserting portion 112. In FIGS. 8A and 8B, the guide grooves 115 are directed downward toward the right. Projections 124 fit into the guide grooves 115, respectively. The valve body 102 and the nozzle member 101 are rotatable with respect to each other about the axis 100A in a state where the projections 124 are fitted into the guide grooves 115. By this relative rotation, each projection 124 can move to the vicinity of the right end or the vicinity of the left end of each guide groove 115.

The COB 116 is provided on the peripheral wall of the inserting portion 112 between the nozzle portion 111 and the guide grooves 115 in the up-down direction 7. The COB 116 is an electronic chip of which an electrical interface is exposed to the outside. The COB 116 includes a memory for storing electronic information. The electronic information stored in the memory of the COB 116 can be read through the electrical interface. It is also possible to write electronic information into the memory of the COB 116 through the electrical interface. The COB 116 projects outward from an outer surface of the peripheral wall of the inserting portion 112.

An annular projection 117 projecting outward is formed on an outer peripheral surface of the inserting portion 112. The projection 117 is positioned on the outer peripheral surface of the inserting portion 112 above the COB 116. An outer diameter of the annular projection 117 is slightly larger than an inner diameter of the housing 103. The inserting portion 112 of the nozzle member 101 is inserted inside the housing 103 from the lower end of the housing 103. The nozzle member 101 and the housing 103 are assembled by press-fitting the projection 117 of the inserting portion 112 into the housing 103.

As shown in FIGS. 8A, 8B and 9, the valve body 102 is accommodated inside the housing 103. An outer shape of the valve body 102 is substantially cylindrical. An axis of the valve body 102 coincides with the axis 100A.

As shown in FIGS. 8A, 8B and 9, the valve body 102 includes a tube portion 121 having a cylindrical shape and a rod 122 arranged inside the tube portion 121. The rod 122 has a columnar shape and projects downward from a lower end of the tube portion 121. A dimension of the rod 122 in the up-down direction 7 is greater than a dimension of the nozzle member 101 in the up-down direction 7. An outer diameter of a lower end of the rod 122 coincides with an inner diameter of the supply port 113 of the nozzle portion 111. As shown in FIG. 9, the supply port 113 is closed by fitting the rod 122 into the supply port 113.

As shown in FIG. 9, an upper end of the rod 122 is connected to the tube portion 121 by a plurality of connecting portions 123. The plurality of connecting portions 123 are circumferentially spaced around the upper end of the rod 122. Spaces between adjacent connecting portions 123 are spaces through which ink can flow. The plurality of connecting portions 123 connect the rod 122 and the tube portion 121 so that an axis of the rod 122 coincides with the axis 100A. The rod 122 extending downward from the connecting portions 123 enters the internal spaces of the inserting portion 112 and the nozzle portion 111 from above the nozzle member 101.

As shown in FIG. 9, the tube portion 121 is inserted into an internal space of the housing 103. An outer diameter of the tube portion 121 is smaller than an inner diameter of the housing 103. As shown in FIGS. 8A, 8B and 9, the tube portion 121 includes the projections 124 projecting outward from an outer peripheral surface. The projections 124 are formed at three positions around the axis 100A. The projection 124 has a substantially parallelogram outer shape when viewed along the radial direction of the tube portion 121. The projections 124 fit into the guide grooves 115 of the nozzle member 101, respectively. The valve body 102 and the nozzle member 101 are rotatable with respect to each other about the axis 100A in a state where the projections 124 are fitted into the guide grooves 115. By this relative rotation, each projection 124 can move to the vicinity of a right end or a left end of each guide groove 115.

In a state where each projection 124 is positioned near the right end of each guide groove 115 as shown in FIG. 8A, as shown in FIG. 9, the valve body 102 is in a state where it is moved downward with respect to the nozzle member 101 (hereinafter referred to as a first state), and the lower end of the rod 122 closes the supply port 113.

Figure 10:
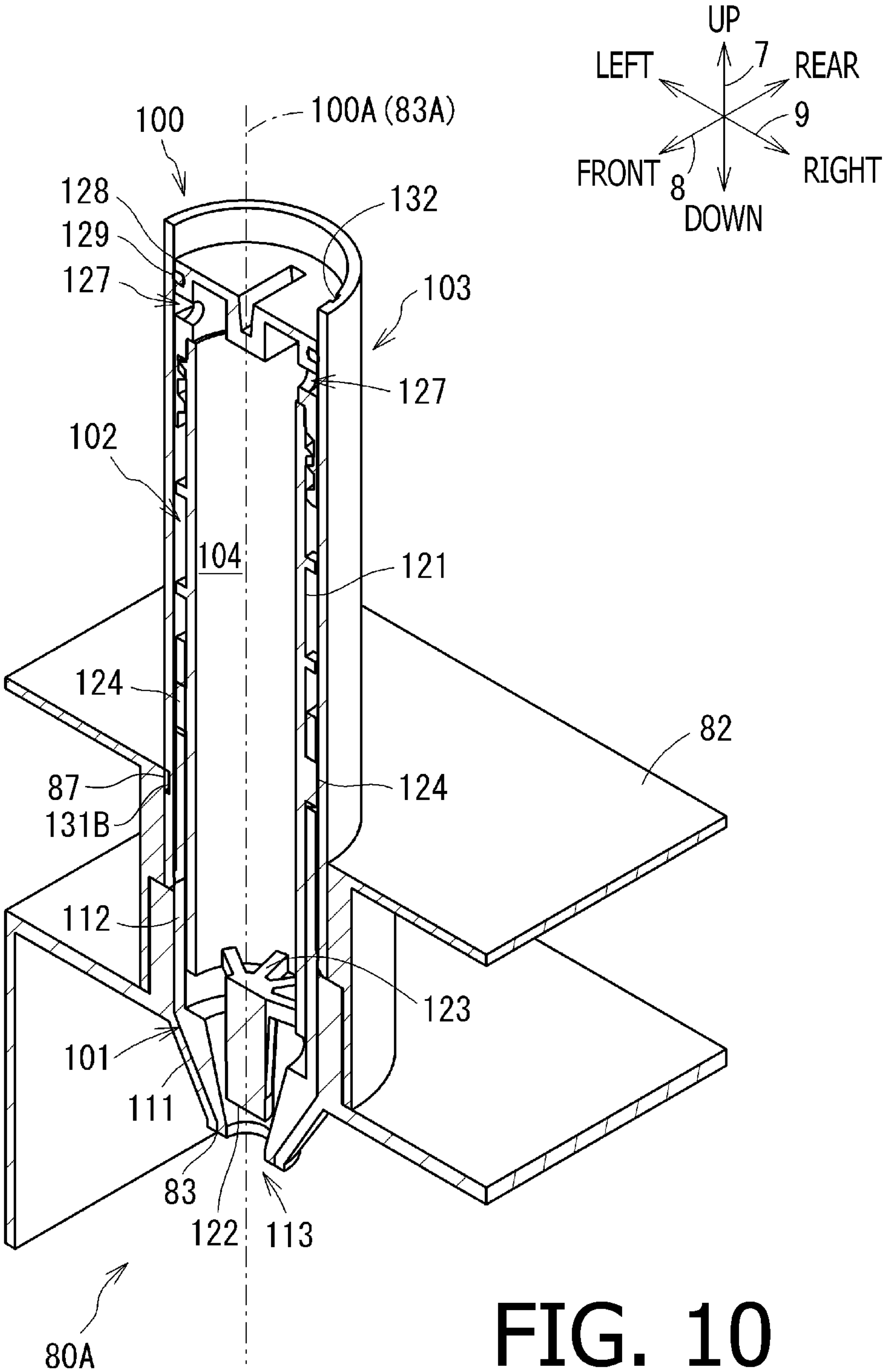
FIG. 10 is a cross-sectional view showing a state in which the bottle in the second state is inserted into the recess of the one of the tanks.

In a state where each projection 124 is positioned near the left end of each guide groove 115 as shown in FIG. 8B, as shown in FIG. 10, the valve body 102 is in a state where it is moved upward with respect to the nozzle member 101 (hereinafter referred to as a second state), the lower end of the rod 122 is positioned above the supply port 113, and the supply port 113 is open.

As shown in FIGS. 8A and 8B, two annular ribs 125 extending annularly along the circumferential direction are formed on an outer peripheral surface of the tube portion 121. Each annular rib 125 projects outward from the outer peripheral surface of the tube portion 121. The two annular ribs 125 are arranged above the guide grooves 115 with an interval in the up-down direction 7. Four notches 126 are formed to each annular rib 125 at intervals of 90 degrees about the axis 100A. The notches 126 of the two annular ribs 125 form pairs in the up-down direction 7. A pair of notches 126 are aligned along the axis 100A. Guide rails 133 (See FIG. 7C.) of the housing 103 fit into the pair of notches 126, respectively. The four guide rails 133 project inward from an inner peripheral surface of the housing 103 and extend along the up-down direction 7. The guide rails 133 are arranged at intervals of 90 degrees about the axis 100A.

An upper end of the tube portion 121 is closed by a plug portion 130. The internal space of the tube portion 121 and an internal space of the nozzle member 101 constitute a storage chamber 104 for storing ink.

As shown in FIGS. 8A, 8B and 9, in the vicinity of an upper end of an outer peripheral surface of the plug portion 130, two through holes 127 communicating an internal space of the plug portion 130 with the outside are formed. The two through holes 127 are arranged at intervals of 180 degrees about the axis 100A. The through holes 127 communicate the storage chamber 104 with the outside.

An annular receiving portion 128 is formed on the outer peripheral surface of the plug portion 130 above the through holes 127. The receiving portion 128 projects outward from the outer peripheral surface and supports an O-ring 129. The O-ring 129 is made of elastically deformable resin and is pressed against an inner peripheral surface of the housing 103. A space between the housing 103 and the plug portion 130 is hermetically and liquid-tightly sealed by the O-ring 129. The valve body 102 is supported on the housing 103 via the O-ring 129 so as to be slidable with respect to the housing 103 in the up-down direction 7.

As shown in FIGS. 6A, 6B and 9, an outer shape of the housing 103 is substantially cylindrical. A dimension of the housing 103 in the up-down direction 7 is greater than a dimension of the valve body 102 in the up-down direction 7. Therefore, the valve body 102 is accommodated in the internal space of the housing 103 and is movable along the up-down direction 7 in the internal space of the housing 103. The nozzle portion 111 of the nozzle member 101 and a portion of the inserting portion 112 where the COB 116 is provided is protruding from the lower end of the housing 103.

As shown in FIG. 6, an outer peripheral surface of the housing 103 is a cylindrical surface. Three grooves 131 are formed on the outer peripheral surface of the housing 103. The three grooves 131 are arranged at intervals of 120 degrees about the axis 100A. Each groove 131 includes a first groove 131A that is open at a lower end surface of the housing 103 and extends in the up-down direction 7, and a second groove 131B that extends to the right in FIG. 6 along the circumferential direction from an upper end of the first groove 131A. The first groove 131A and the second groove 131B define a continuous space. The projections 87 of the tank 80 can enter the grooves 131.

Figures 7A, 7B, 7C:
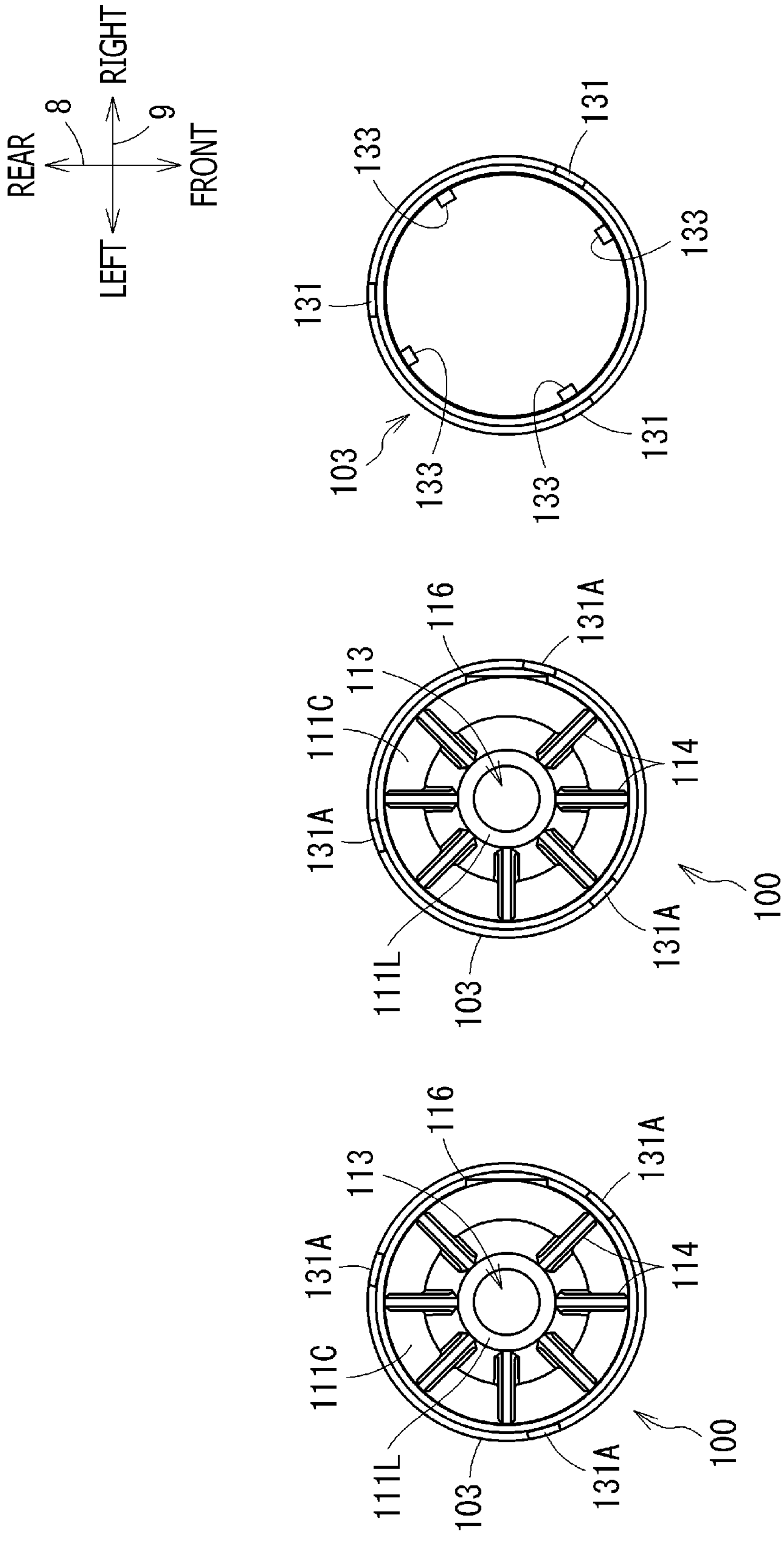
FIG. 7A is a bottom view of the bottle.
FIG. 7B is a bottom view of a differently assembled bottle.
FIG. 7C is a bottom view of a housing.

As shown in FIG. 7A, in the bottle 100 in the first state, the relative positional relationship about the supply port 113 between the position where the engaging rib 114 is not formed and the positions of the three first grooves 131A is fixed. A position of the nozzle member 101 having the engaging ribs 114 with respect to the housing 103 having the first grooves 131 about the supply port 113 is fixed by the fitting of the notches 126 of the valve body 102 with the guide rails 133 of the housing 103.

Since the four notches 126 and the four guide rails 133 are arranged at intervals of 90 degrees, there are four possible relative positional relationships between the position where the engaging rib 114 is not formed and the positions of the three first grooves 131A in which the relative positions are shifted at intervals of 90 degrees (See, for example, FIG. 7B). That is, one set of four types of bottles 100 can be made. In the present embodiment, the relative positional relationship between the position where the engaging rib 114 is not formed and the position of the three first grooves 131A in the bottle 100 coincides with the relative positional relationship between the position where the groove 86 is not formed and the three projections 87 around the injection port 83 of the tank 80A, but does not coincide with that of the tank 80B.

As shown in FIGS. 6A, 6B and 9, two grooves 132 are formed near an upper end of the inner peripheral surface of the housing 103. The two grooves 132 are arranged at intervals of 180 degrees about the axis 100A. Each groove 132 is open to an upper end surface of the housing 103 and extends in the up-down direction 7. A lower end of the groove 132 is positioned above the O-ring 129 of the valve body 102 in the first state.

The lower end of the groove 132 is positioned below the O-ring 129 of the valve body 102 in the second state. The two grooves 132, together with the through holes 127 of the valve body 102, constitute an air communication passage that communicates the storage chamber 104 with the outside. Therefore, in the first state shown in FIG. 9, the air communication passage is closed. In the second state shown in FIG. 10, the air communication passage is open.

Four guide rails 133 are formed on the inner peripheral surface of the housing 103 below the grooves 132. As shown in FIG. 7C, the guide rails 133 are arranged at intervals of 90 degrees about the axis 100A. Each guide rail 133 projects inward from the inner peripheral surface of the housing 103 and extends linearly along the up-down direction 7. A circumferential dimension of each guide rail 133 is slightly smaller than a circumferential dimension of each notch 126. The guide rails 133 fit in the pair of notches 126 and guide the valve body 102 so as to be movable along the up-down direction 7.

[Supply of Ink to Tank 80 from Bottle 100]

Hereinafter, a method of supplying ink to the tank 80 from the bottle 100 will be described below with reference to FIGS. 9 and 10.

When ink is discharged from the nozzles 39 of the head 38 and ink in the tank 80A is consumed, for example, in response to a notification indicating that a remaining amount of ink in the tank 80A is small, a user replenishes the tank 80A with ink. In order to replenish the tank 80A with ink, the user rotates an upper cover of the multifunction device 10 to expose the upper wall 82 of the tank 80A to the outside. Then, the user removes the lid 85 to expose the recess 84 to the outside.

The user prepares the bottle 100 in which ink is stored and inserts the nozzle portion 111 of the bottle 100 into the recess 84 of the tank 80A with the supply port 113 directed downward. At this time, the bottle 100 is in a state in which the rod 122 closes the supply port 113, that is, in the first state.

In inserting the nozzle portion 111, the user aligns the first grooves 131A of the housing 103 with the projections 87 of the recess 84. When positions of the first grooves 131A and the projections 87 match, the projections 87 can enter the first grooves 131A, and the bottle 100 can be inserted into the recess 84 with the projections 87 as guides.

As shown in FIG. 9, when the projections 87 reach upper ends of the first grooves 131A, the supply port 113 (lower end of the nozzle portion 111) of the bottle 100 fits into the injection port 83 of the tank 80, and the supply port 113 and the injection port 83 communicate with each other so that ink can flow therethrough. The engaging ribs 114 of the bottle 100 fit into the grooves 86 of the tank 80A, respectively. In this state, the axis 83A and the axis 100A coincide with each other.

As shown in FIGS. 7A and 7B, the engaging ribs 114 of the bottle 100 are formed at seven positions around the supply port 113. As shown in FIG. 5A, the grooves 86 of the tank 80A are formed at seven positions around the injection port 83. In addition, in the bottle 100, since the relative positional relationship between one position where the engaging rib 114 does not exist and the three first grooves 131A around the supply port 113 coincides with the relative positional relationship between the position where the groove 86 is not formed and the three projections 87 in the tank 80A, when the projections 87 reach the upper ends of the first grooves 131A, the engaging ribs 114 fit into the grooves 86 of the tank 80A.

On the other hand, in the bottle 100, the relative positional relationship between one position where the engaging rib 114 does not exist and the three first grooves 131A around the supply port 113 does not coincide with the relative positional relationship between the position where the groove 86 is not formed and the three projections 87 in the tank 80B. Further, while the bottle 100 has seven engaging ribs 114, the tank 80B has only six grooves 86. Therefore, even if the bottle 100 is inserted into the recess 84 of the tank 80B in a state where the housing 103 is rotated by 90 degrees with respect to the nozzle member 101 from the first state, since at least one engagement rib 114 does not fit into the groove 86, the projection 87 does not reach the upper end of the first groove 131A.

In the state shown in FIG. 9 (i.e., in the first state), the housing 103 can be rotated about the axis 100A with respect to the tank 80 using the projections 87 as guides. When the user rotates the housing 103 clockwise when viewed from the top, the projections 87 enter the second grooves 131B, respectively. In other words, the grooves 131B allow the housing 103 to rotate in a state where the engaging ribs 114 are fitted in the grooves 86. Even if the housing 103 is rotated, since the engaging ribs 114 are fitted in the grooves 86, the nozzle member 101 is prevented from rotating with respect to the tank 80. That is, the nozzle member 101 does not rotate with the rotation of the housing 103. Accordingly, the housing 103 rotates clockwise with respect to the nozzle member 101.

Since the notches 126 are fitted to the guide rails 133, when the housing 103 is rotated, the valve body 102 rotates together with the housing 103. In other words, the valve body 102 also rotates clockwise with respect to the nozzle member 101. When the valve body 102 is rotated clockwise with respect to the nozzle member 101 from the first state shown in FIG. 7A, the valve body 102 is guided by the fitting between the projections 124 of the nozzle member 101 and the guide grooves 115 of the valve body 102, and slides upward with respect to the housing 103 while rotating with respect to the nozzle member 101.

Since the fitting between the notches 126 and the guide rails 133 does not prevent the valve body 102 from sliding in the up-down direction 7 with respect to the housing 103, the valve body 102 slides upward along the axis 100A in the internal space of the housing 103 while rotating together with the housing 103 and thereby moves to the second state shown in FIG. 10. In the process of changing the state of the bottle 100 from the first state to the second state, after the supply port 113 is opened, the air communication passage opens through the groove 132.

In the second state, the lower ends of the grooves 132 of the housing 103 are below the O-ring 129 in the up-down direction 7 and communicates with the through holes 127 of the valve body 102. As a result, the storage chamber 104 of the bottle 100 communicates with the outside through the through holes 127 and the grooves 132 and is atmospherically relieved. As shown in FIG. 10, in the second state, the lower end of the rod 122 is positioned above the supply port 113 and thus the supply port 113 is open. As a result, ink stored in the storage chamber 104 flows down to the internal space 81 of the tank 80 through the supply port 113 and the injection port 83.

As shown in FIG. 10, in the second state, since the projections 87 of the tank 80 are in the second grooves 131B of the housing 103, the bottle 100 is prevented from moving upward with respect to the tank 80. That is, in the second state, the bottle 100 cannot be pulled out from the tank 80.

When the supply of ink from the bottle 100 to the tank 80 is completed, the user rotates the housing 103 counter-clockwise with respect to the tank 80 from the second state shown in FIG. 10 to the first state shown in FIG. 9. Thus, the projections 87 of the tank 80 can enter the first grooves 131A of the housing 103, and the bottle 100 can move upward with respect to the tank 80. In the bottle 100 in the first state, since the rod 122 closes the supply port 113, even if ink remains in the storage chamber 104 of the bottle 100, ink does not flow out from the supply port 113 of the bottle 100 removed from the tank 80.

Effects of Embodiment

According to the above-described embodiment, the engaging ribs 114 of the bottle 100 selectively fit only into the grooves 86 of the tank 80A. When only the housing 103 is operated in a state where the engaging ribs 114 are fitted into the groove 86, the valve body 102 and the housing 103 can be rotated with respect to the nozzle member 101.

The bottle 100 in the first state can be selectively fitted only to the tank 80A by the engaging ribs 114 and the grooves 131 of the bottle 100. By the combination of the nozzle member 101, the valve body 102 and the housing 103, the relative positional relationship between the position where the engaging rib 114 is not formed and the first grooves 131A can be changed. As a result, when a plurality of used bottles 100 are disassembled and cleaned and are then assembled and reused, the relative positional relationship between the position where the engaging rib 114 is not formed and the first grooves 131A can be changed to make the bottles 100 that can be fitted to either the tank 80A or the tank 80B.

By the fitting of the projections 87 of the tank 80A into the second grooves 131B of the bottle 100 in the second state, the bottle 100 in the second state is prevented from being removed from the tank 80A.

In each of the tanks 80A and 80B, a lower portion having the groove 86 and an upper portion having the projections 87 can be formed as separate members and then assembled together. Further, the upper portions of the tanks 80A and 80B having the projections 87 can be formed as an integral part. This makes it less likely to make mistake in the arrangement of the tanks 80A and 80B at the time of manufacturing, and makes it easier to assemble the tanks 80A and 80B.

[Variation]

In the above-described embodiments, the three projections 87 of the tanks 80A and 80B and the three grooves 131 of the bottle 100 are different in their positions around the axes 83A and 100A but have the same shape. However, the projections 87 and the grooves 131 may have different shapes depending on their positions. Hereinafter, a variation in which the shapes of the projections 87 and the grooves 131 are different from the above-described embodiment will be described. Since components other than the projections 87 and the grooves 131 are the same, detailed description thereof will be omitted.

Figure 12:
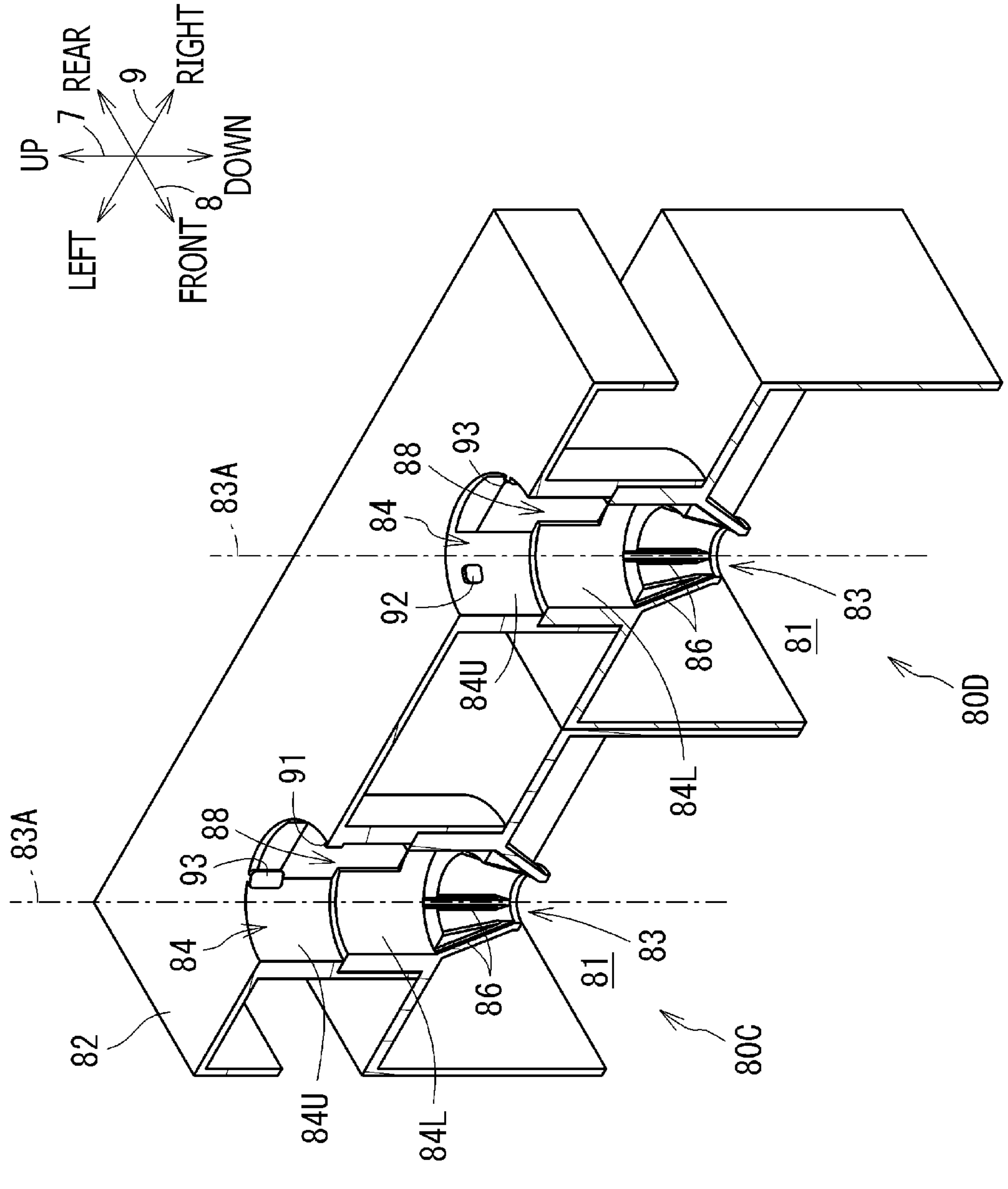
FIG. 12 is a cross-sectional view showing sections of the other tanks along the up-down direction including axes of the other tanks.
Figure 13A:
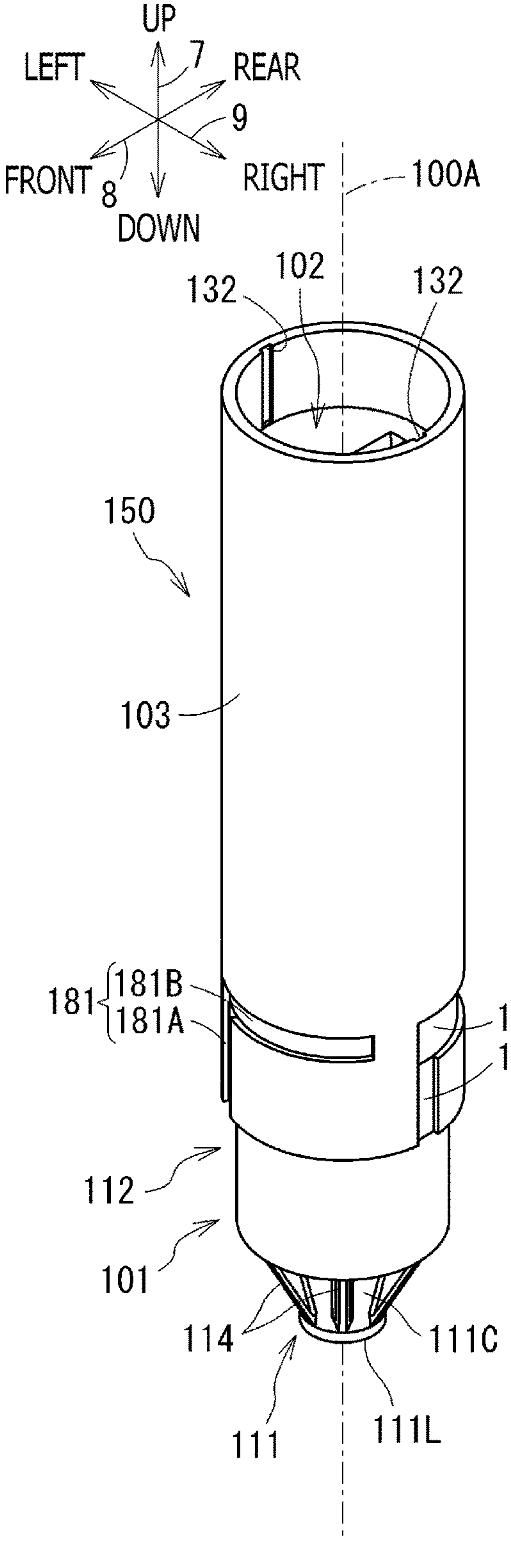
FIG. 13A shows an external perspective view of another bottle.
Figure 13B:
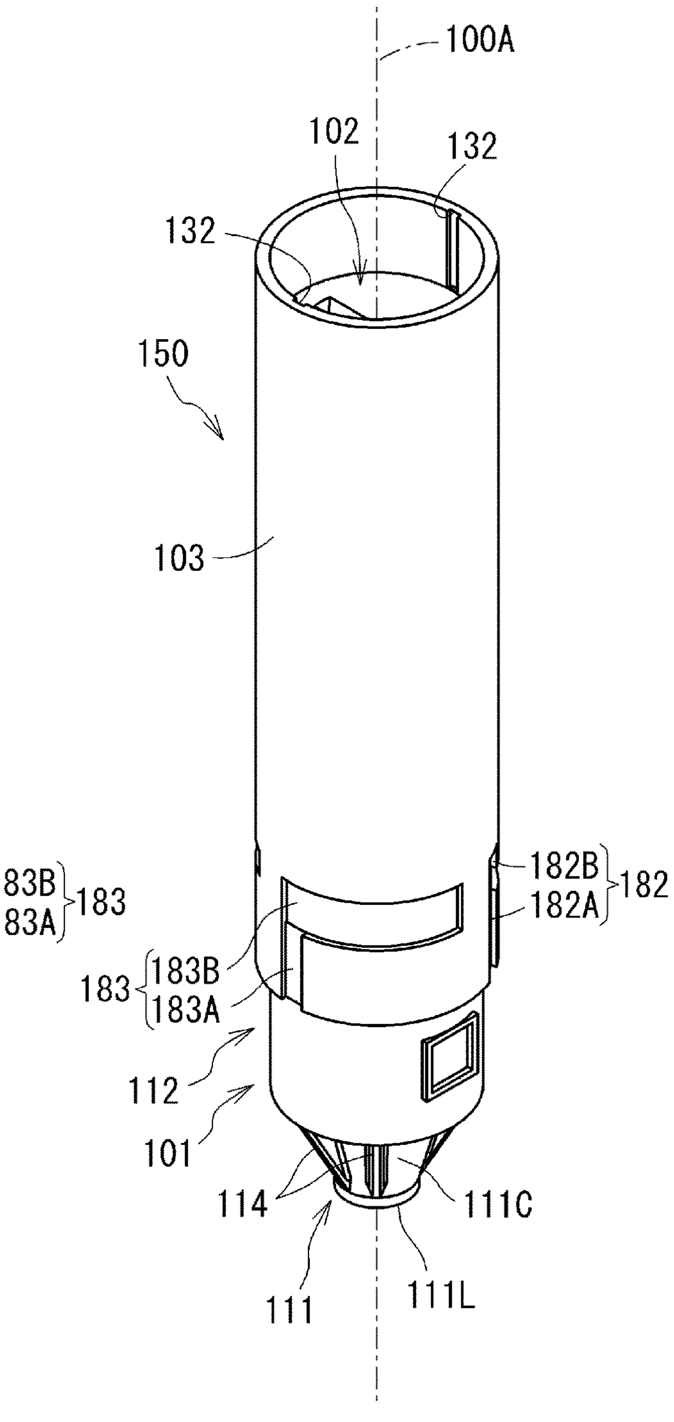
FIG. 13B shows another external perspective view of the other bottle.
Figure 14A:
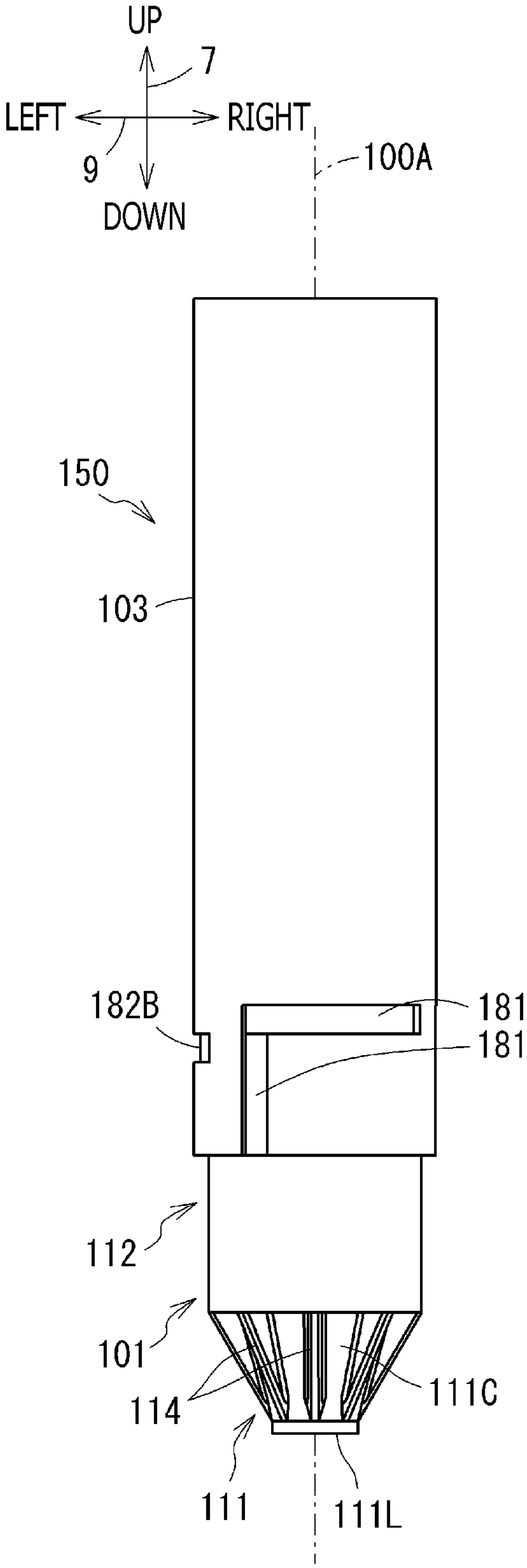
FIG. 14A shows a side view of the other bottle.
Figure 14B:
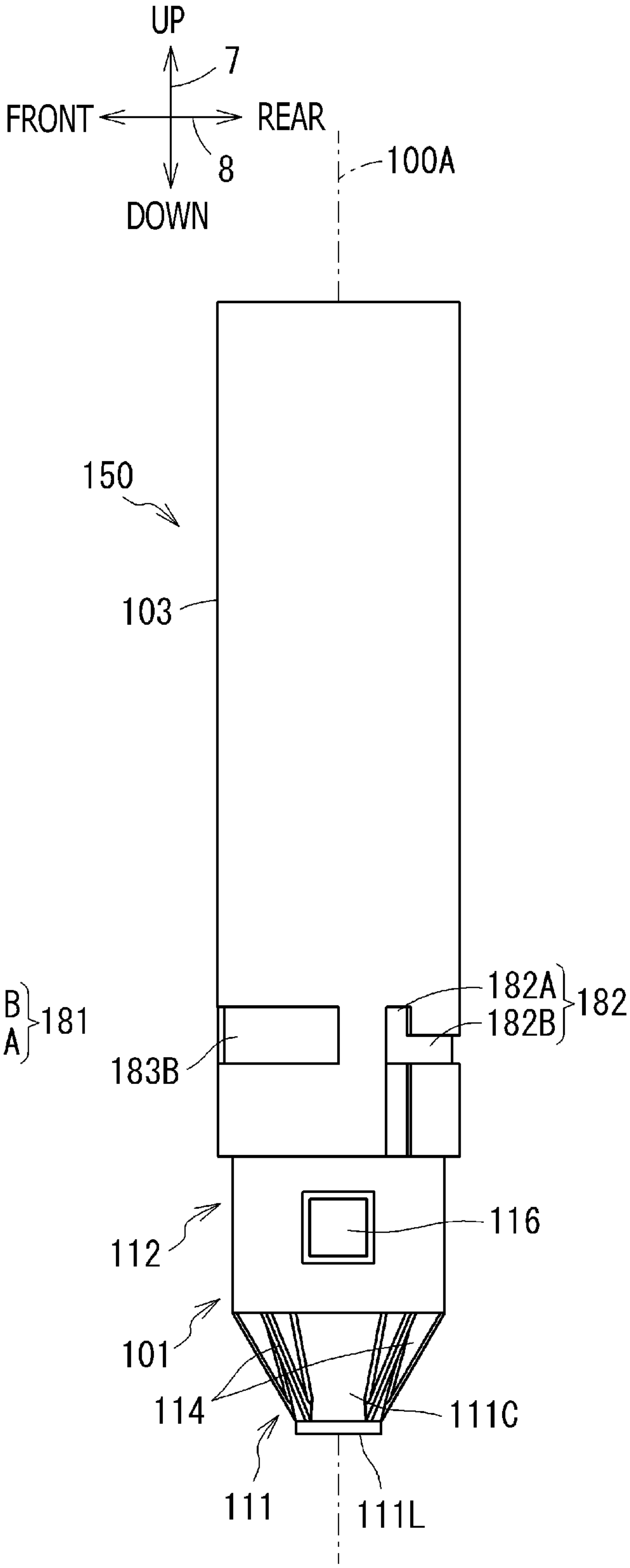
FIG. 14B shows another side view of the other bottle.

As shown in FIG. 12, in tanks 80C and 80D, a plurality of grooves 86 are radially formed, and are partially unevenly arranged in the circumferential direction. In other words, the plurality of grooves 86 are radially formed around the injection port 83 with equal intervals in the circumferential direction, but the groove 86 is not formed at some positions in the circumferential direction. Each groove 86 extends linearly outward from the injection port 83.

In the present variation, in each of the tanks 80C and 80D, seven grooves 86 are arranged at intervals of 45 degrees obtained by dividing 360 degrees around the injection port 83 into eight equal parts. Therefore, an interval between two grooves 86 sandwiching one position among eight where the groove 86 is not formed is 90 degrees.

Figure 11:
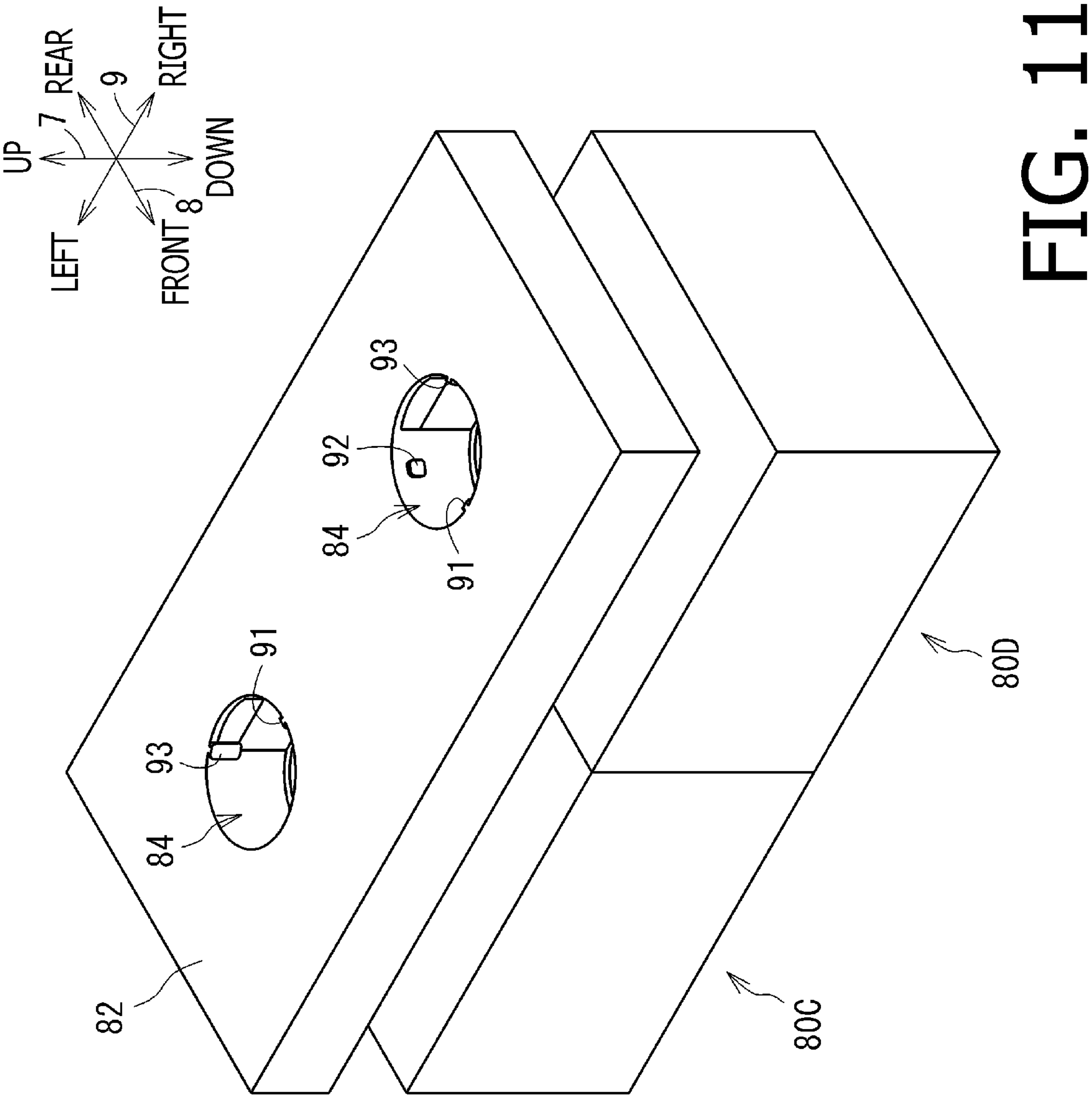
FIG. 11 is an external perspective view of other tanks.

As shown in FIGS. 11 and 12, the tanks 80C and 80D respectively have three projections 91,92, and 93 of which arrangements around the injection port 83 in the tanks 80C and 80D are different. The three projections 91, 92, and 93 are arranged at intervals of 120 degrees about the axis 83A of the injection port 83. The projections 91, 92 and 93 are common in that they project from the upper end portion of the recess 84 toward the axis 83A, but are different in positions and dimensions in the up-down direction 7. On the other hand, positions of the projections 91, 92 and 93 about the axis 83A with respect to one position where the groove 86 is not formed are the same. In other words, each of the tanks 80C and 80D has three projections 91, 92 and 93, and the positions of the projections 91, 92 and 93 around the injection port 83 are different by 120 degrees or 240 degrees.

The projection 91 is the same as the projections 87 (See FIGS. 3 and 4). The projection 91 is generally square when viewed from the axis 83A along the radial direction. An upper end of the projection 91 coincides with the upper end of the recess 84 (an upper surface of the upper wall 82). A dimension L1 of the projection 91 in the up-down direction 7 is the same as a dimension L1 of the projection 92 in the up-down direction 7, and is approximately half of a dimension L2 of the projection 93 in the up-down direction 7 (dimension L1<dimension L2, dimension L1×2=dimension L2). A dimension of the projection 91 in the circumferential direction of the axis 83A is the same as dimensions of the projections 92 and 93 in the circumferential direction of the axis 83A.

The projection 92 is positioned 120 degrees clockwise away from the projection 91 about the axis 83A. The projection 92 is square when viewed from the axis 83A along the radial direction and is the same as the projection 91. An upper end of the projection 92 is positioned below the upper end of the recess 84 (the upper surface of the upper wall 82). That is, the position in the up-down direction 7 of the projection 92 is lower than the projection 91.

The projection 93 is positioned 120 degrees clockwise away from the projection 92 about the axis 83A. The projection 93 is rectangular elongated in the up-down direction 7 when viewed from the axis 83A along the radial direction. An upper end of the projection 93 coincides with the upper end of the recess 84 (the upper surface of the upper wall 82). That is, in the up-down direction 7, the upper end of the projection 93 coincides with the upper end of the projection 91, and a lower end of the projection 93 coincides with a lower end of the projection 92.

As shown in FIGS. 13A, 13B, 14A and 14B, a bottle 150 has three grooves 181, 182 and 183 formed on the outer peripheral surface of the housing 103. The three grooves 181, 182 and 183 are arranged at intervals of 120 degrees about the axis 100A.

The groove 181 is similar to the grooves 131. The groove 181 has a first groove 181A that is open to the lower end surface of the housing 103 and extends in the up-down direction 7, and a second groove 181B that extends rightward in FIG. 14A along the circumferential direction from an upper end of the first groove 181A. The first groove 181A and the second groove 181B define a continuous space. The projections 91 of the tanks 80C and 80D can enter the groove 181.

A dimension of the first groove 181A along the circumferential direction of the axis 100A is nearly equal to the dimension of the projection 91 along the circumferential direction. The second groove 181B extends rightward from the upper end of the first groove 181A. A dimension of the second groove 181B along the up-down direction 7 is nearly equal to the dimension L1 of the projection 91 along the up-down direction 7.

The groove 182 is positioned 120 degrees clockwise away from the groove 181 about the axis 100A. The groove 182 has a first groove 182A that is open at the lower end surface of the housing 103 and extends in the up-down direction 7, and a second groove 182B that extends rightward in FIG. 14B along the circumferential direction from below the upper end of the first groove 182A. The first groove 182A and the second groove 182B define a continuous space. The projections 92 of the tanks 80C and 80D can enter the groove 182.

A dimension of the first groove 182A along the circumferential direction of the axis 100A is nearly equal to the dimension of the projection 92 along the circumferential direction. That is, the dimension of the first groove 181A along the circumferential direction of the axis 100A is equal to the dimension of the first groove 182A along the circumferential direction of the axis 100A. The second groove 182B extends rightward from below an upper end of the first groove 182A. A dimension between the second groove 182B and the upper end of the first groove 182A coincides with a dimension between the projection 92 and the upper end of the recess 84. A dimension of the second groove 182B along the up-down direction 7 is nearly equal to the dimension L1 of the projection 92 along the up-down direction 7. That is, the dimension of the second groove 181B along the up-down direction 7 is equal to the dimension of the second groove 182B along the up-down direction 7.

The groove 183 is positioned 120 degrees clockwise away from the groove 182 about the axis 100A. The groove 183 has a first groove 183A that is open at the lower end surface of the housing 103 and extends in the up-down direction 7, and a second groove 183B that extends rightward in FIG. 14B along the circumferential direction from an upper end of the first groove 183A. The first groove 183A and the second groove 183B define a continuous space. The projections 93 of the tanks 80C and 80D can enter the groove 183.

A dimension of the first groove 183A along the circumferential direction of the axis 100A is nearly equal to the dimension of the projection 93 along the circumferential direction. That is, the dimension of the first groove 181A along the circumferential direction of the axis 100A is equal to the dimension of the first groove 183A along the circumferential direction of the axis 100A. The second groove 183B extends rightward from an upper end of the first groove 183A. A dimension of the second groove 183B along the up-down direction 7 is nearly equal to the dimension L2 of the projection 93 along the up-down direction 7.

Although not shown in the drawings, when three notches 126 and guide rails 133 (See FIGS. 7C, 8A and 8B) are respectively arranged in the bottle 150 at intervals of 120 degrees, there are three possible relative positional relationships between the position where the engaging rib 114 is not formed and the positions of the three grooves 181, 182 and 183 in which the relative positions are shifted at intervals of 120 degrees. Therefore, by the combination of the nozzle member 101, the valve body 102 and the housing 103, the relative positional relationship between the position where the engaging rib 114 is not formed and the positions of the three grooves 181, 182 and 183 can be changed.

Like the bottle 100, the bottle 150 has seven engaging ribs 114, and the engaging rib 114 is not formed at one of eight positions at intervals of 45 degrees around the supply port 113. The relative positional relationship between the position where the engaging rib 114 is not formed and the positions of the grooves 181, 182 and 183 corresponds to the relative positional relationship in the tank 80C between the position where the groove 86 is not formed and the positions of the projections 91, 92 and 93. That is, in a state where the seven engaging ribs 114 are fitted in the seven grooves 86, the projection 91 enters the groove 181, the projection 92 enters the groove 182, and the projection 93 enters the groove 183.

The user inserts the nozzle portion 111 of the bottle 150 into the recess 84 of the tank 80C with the supply port 113 facing downward. At this time, the bottle 150 is in a state in which the rod 122 closes the supply port 113, that is, in the first state.

In inserting the nozzle portion 111, the user aligns the first grooves 181A, 182A and 183A of the housing 103 with the projections 91, 92 and 93 of the recess 84. When the positions of the first grooves 181A, 182A and 183A match the positions of the projections 91, 92 and 93 of the recess 84, the projections 91, 92 and 93 can enter the first grooves 181A, 182A and 183A, respectively.

In a state where the seven engaging ribs 114 are fitted in the seven grooves 86, the housing 103 can be rotated with respect to the tank 80C about the axis 100A using the projections 91, 92 and 93 as guides. When the user rotates the housing 103 clockwise, the projection 91 enters the second groove 181B, the projection 92 enters the second groove 182B, and the projection 93 enters the second groove 183B. Even when the housing 103 is rotated, since the engaging ribs 114 are fitted in the grooves 86, the nozzle member 101 is prevented from rotating with respect to the tank 80C. Therefore, the housing 103 rotates clockwise with respect to the nozzle member 101. As a result, the bottle 150 enters the second state, the rod 122 opens the supply port 113, and the ink in the storage chamber 104 flows into the tank 80C.

The bottle 150 is adapted to the tank 80C. The bottle 150 can be inserted into the recess 84 of the tank 80D, but cannot be rotated. Any of the projections 91, 92 and 93 can enter the first grooves 181A, 182A, and 183A. Therefore, the nozzle portion 111 of the bottle 150 can also be inserted into the recess 84 of the tank 80D. For example, the projection 93 enters the first groove 181A, the projection 91 enters the first groove 182A, and the projection 92 enters the first groove 183A. In this case, the projection 93 cannot enter the second groove 181B. Furthermore, the projection 91 cannot enter the second groove 182B. Therefore, the housing 103 of the bottle 150 inserted into the recess 84 of the tank 80D cannot be rotated about the axis 100A.

[Other Variations]

The combination of the tanks 80A and 80B in the above-described embodiment and the combination of the tanks 80C and 80D in the variation are merely examples and thus other combinations may be used. For example, for a set of bottles 100 and 150, the tanks 80A and 80C may be combined. In this case, in the set of bottles 100 and 150, the positions of the second grooves 131B in the up-down direction 7 are different from the position of the second groove 182B in the up-down direction 7.

In the above-described embodiment and variation, the grooves 132 functions as the air communication passage, but the air communication passage may not be provided to the bottles 100 and 150. In this case, two flow paths may be formed in the rod 122 along the axis 100A such that, in a state where the rod 122 protrudes from the supply port 113, the two flow paths communicate the storage chamber 104 with the outside and the ink in the storage chamber 104 flows out by gas-liquid replacement.

In the above-described embodiment, the nozzle member 101 has the guide grooves 115 and the valve body 102 has the projections 124. However, since the projection and the groove are in pair, it is sufficient if either one of the nozzle member 101 and the valve body 102 has the projection and the other has the groove. Therefore, a guide groove may be formed on the outer peripheral surface of the inserting portion 112 of the nozzle member 101, a projection projecting inward may be formed on the inner peripheral surface of the tube portion 121 of the valve body 102, and the guide groove and the projection may be fitted to each other. The guide grooves 115 and the projections 124 may be realized by male screws and female screws.

In the above-described embodiment, the engaging ribs 114 of the nozzle member 101 engage with the grooves 86 of the tank 80. However, the configuration for preventing the nozzle member 101 from rotating about the axis 100A is not limited to the engaging ribs 114. For example, a groove may be formed to the nozzle member 101, and the rotation of the nozzle member 101 may be prevented by an engagement of the groove with a projection formed to the tank 80.

Each of the nozzle member 101, the valve body 102 and the housing 103 does not necessarily need to be an integral member, but may be formed by assembling a plurality of members. the shape of the supply port 113 is not limited to a circular shape, but may be other shapes such as an elliptical shape or a rectangular shape. The air communication passage is not limited to the passage formed by the through holes 127 and the grooves 132. The COB 116 may not be provided to the bottle 100 and 150.

In the tank 80, the injection port 83 and the recess 84 may be formed on other than the upper wall 82. For example, the injection port 83 and the recess 84 may be formed on an outer surface of the tank 80 and on an inclined wall inclined with respect to the up-down direction 7. The tank 80 does not necessarily need to be mounted on the carriage 40, and the head 38 and the tank 80 may be connected to each other by a tube or the like so that ink can flow therethrough.

In the above-described embodiments, ink has been described as an example of the printing liquid. However, the printing liquid is not limited to ink. For example, the printing liquid may be a pretreatment liquid that is ejected onto the recording sheet prior to the ink at the time of printing, water that is sprayed to prevent the nozzles 39 of the head 38 from drying, or the like.

The tanks 80A and 80B in the above-described embodiment are examples of a first tank and a second tank according to aspects of the present disclosures. The grooves 86 in the above-described embodiment are examples of a fitted portion and a first groove according to aspects of the present disclosures. The projections 87 in the above-described embodiment and the projections 91,92, and 93 in the above-described variation are examples of the fitted portion according to aspects of the present disclosures. The bottle 100 in the above-described embodiment is an example of a printing liquid container according to aspects of the present disclosures. The nozzle member 101 in the above-described embodiment is an example of a first member according to aspects of the present disclosures. The valve body 102 and the housing 103 in the above-described embodiment are examples of a second member according to aspects of the present disclosures. The ribs 114 in the above-described embodiment are examples of a first fitting portion and a projection according to aspects of the present disclosures. The rod 122 in the above-described embodiment is an example of a valve according to aspects of the present disclosures. The first groove 131A in the above-described embodiment and the first grooves 181A, 182A and 183A in the above-described variation are examples of a second groove according to aspects of the present disclosures. The second groove 131B in the above-described embodiment and the second grooves 181B, 182B and 183B in the above-described variation are examples of a third groove according to aspects of the present disclosures. The tanks 80C and 80D in the above-described variation are examples of the first tank and the second tank according to aspects of the present disclosures.

What is claimed is:

1. A printing liquid container configured to fit to one of a first tank and a second tank each including a fitted portion having an injection port, the printing liquid container comprising:

a first member having a supply port communicating with an internal space; and a second member having a valve configured to open or close the supply port, wherein:

the first member and the second member are coupled to each other so that an entire first member or an entire second member is rotatable with respect to the other of the first member or the second member between a first state and a second state, an internal space of the first member and an internal space of the second member constitute a storage chamber configured to store liquid, the valve closes the supply port in the first state and opens the supply port in the second state, one of the first member and the second member has a first fitting portion configured to fit to the fitted portion of the first tank or the second tank, an other of the first member and the second member is rotatable with respect to the fitted portion in a state where at least a portion of the one of the first member and the second member is inserted into the fitted portion, and the one of the first member and the second member is configured not to be rotated by the rotation of the other of the first member and the second member due to the fitting between the fitted portion and the first fitting portion.

2. The printing liquid container according to claim 1, wherein:

the other of the first member and the second member has a second fitting portion configured to fit to the fitted portion of at least one of the first tank and the second tank, the first fitting portion and the second fitting portion fit to the fitted portion in the first state, and the second fitting portion allows the other of the first member and the second member to rotate with respect to the fitted portion in a state where the fitted portion and the first fitting portion are fitted to each other.

3. The printing liquid container according to claim 2, wherein the other of the first member and the second member cannot be removed from the fitted portion due to fitting of the second fitting portion to the fitted portion in the second state.

4. The printing liquid container according to claim 2, wherein:

the second fitting portion allows rotation of the other of the first member and the second member with respect to the fitted portion of one of the first tank and the second tank in a state where the second fitting portion is fitted to the fitted portion of the one of the first tank and the second tank, and the second fitting portion does not allow rotation of the other of the first member and the second member with respect to the fitted portion of an other of the first tank and the second tank in a state where the second fitting portion is fitted to the fitted portion of the other of the first tank and the second tank.

5. The printing liquid container according to claim 2, wherein the fitted portion of each of the first tank and the second tank includes a portion corresponding to the first fitting portion and a portion corresponding to the second fitting portion.

6. The printing liquid container according to claim 2, wherein the first member and the second member are assembled such that a relative position between the first fitting portion and the second fitting portion around a rotation axis can be changed.

7. The printing liquid container according to claim 2, wherein:

the first member includes the first fitting portion, and the second member includes the second fitting portion.

8. The printing liquid container according to claim 7, wherein the first fitting portion is a projection or a first groove extending radially from a periphery of the supply port.

9. The printing liquid container according to claim 7, wherein the second fitting portion includes:

a second groove extending on an outer surface of the second member in a first direction along an axis of the relative rotation; and a third groove extending on the outer surface of the second member from the second groove in a second direction along a circumferential direction of the axis.

10. The printing liquid container according to claim 9, wherein the outer surface of the second member along the axis is a cylindrical surface.

11. A container set including a first printing liquid container and a second printing liquid container, each of the first printing liquid container and the second printing liquid container comprising:

a first member having a supply port communicating with an internal space; and a second member having a valve configured to open or close the supply port, wherein:

the first member and the second member are coupled to each other so as to be rotatable with respect to each other between a first state and a second state, an internal space of the first member and an internal space of the second member constitute a storage chamber configured to store liquid, the valve closes the supply port in the first state and opens the supply port in the second state, one of the first member and the second member has a projection or a first groove, an other of the first member and the second member has, on an outer surface thereof, a second groove extending in a first direction along an axis of the relative rotation, and a third groove extending from the second groove in a second direction along a circumferential direction of the axis, and the third groove of the first printing liquid container and the third groove of the second printing liquid container are different in position with respect the second groove in the first direction.

12. A system including a first printing liquid container, a second printing liquid container, a first tank, and a second tank, wherein each of the first tank and the second tank comprises a fitted portion having an injection port, the fitted portion of the first tank and the fitted portion of the second tank being different from each other, and wherein the first printing liquid container and the second printing liquid container are configured to fit to the fitted portions of the first tank and the second tank, respectively, each of the first printing liquid container and the second printing liquid container comprising:

a first member having a supply port communicating with an internal space; and a second member having a valve configured to open or close the supply port, wherein:

the first member and the second member are coupled to each other so as to be rotatable with respect to each other between a first state and a second state, an internal space of the first member and an internal space of the second member constitute a storage chamber configured to store liquid, the valve closes the supply port in the first state and opens the supply port in the second state, one of the first member and the second member has a first fitting portion configured to fit to the fitted portion, an other of the first member and the second member is rotatable with respect to the fitted portion in a state where at least a portion of the other of the first member and the second member is inserted into the fitted portion, and the one of the first member and the second member is configured not to be rotated by the rotation of the other of the first member and the second member due to the fitting between the fitted portion and the first fitting portion.

13. The system according to claim 12, wherein:

the other of the first member and the second member has a second fitting portion configured to fit to the fitted portion, the first fitting portion and the second fitting portion fit to the fitted portion in the first state, and the second fitting portion allows the other of the first member and the second member to rotate with respect to the fitted portion in a state where the fitted portion and the first fitting portion are fitted to each other.

14. The system according to claim 13, wherein the other of the first member and the second member cannot be removed from the fitted portion due to fitting of the second fitting portion to the fitted portion in the second state.

15. The system according to claim 13, wherein:

when the first printing liquid container is fitted to the fitted portion of the first tank, or when the second printing liquid container is fitted to the fitted portion of the second tank, the second fitting portion allows rotation of the other of the first member and the second member with respect to the fitted portion in a state where the second fitting portion is fitted to the fitted portion, and when the first printing liquid container is fitted to the fitted portion of the second tank, or when the second printing liquid container is fitted to the fitted portion of the first tank, the second fitting portion does not allow rotation of the other of the first member and the second member with respect to the fitted portion in a state where the second fitting portion is fitted to the fitted portion.

16. The system according to claim 13, wherein the fitted portion of each of the first tank and the second tank includes a portion corresponding to the first fitting portion and a portion corresponding to the second fitting portion.

17. The system according to claim 13, wherein the first member and the second member are assembled such that a relative position between the first fitting portion and the second fitting portion around a rotation axis can be changed.

18. The system according to claim 13, wherein:

the first member includes the first fitting portion, and the second member includes the second fitting portion.

19. The system according to claim 18, wherein the first fitting portion is a projection or a first groove extending radially from a periphery of the supply port.

20. The system according to claim 18, wherein the second fitting portion includes:

a second groove extending on an outer surface of the second member in a first direction along an axis of the relative rotation; and a third groove extending on the outer surface of the second member from the second groove in a second direction along a circumferential direction of the axis.

21. A printing liquid container configured to fit to one of a first tank and a second tank each including a fitted portion having an injection port, the printing liquid container comprising:

a first member having a supply port communicating with an internal space, the first member having a fitting portion configured to fit into the fitted portion of the first tank or the second tank; and a second member having a housing and a valve, the valve being configured to open or close the supply port, wherein the housing and the valve are configured to rotate together with respect to the first member between a first state and a second state, when the fitting portion of the first member is inserted into the fitted portion, and the first member does not rotate when the second member rotates due to the fitting between the fitted portion and the fitting portion, and wherein the valve closes the supply port in the first state and opens the supply port in the second state.

* * * * *